(12) United States Patent
Li et al.

(10) Patent No.: US 10,766,016 B2
(45) Date of Patent: Sep. 8, 2020

(54) SORBENT COMPOSITION FOR USE IN A FLUE GAS TRAIN INCLUDING A BAGHOUSE

(71) Applicant: ADA Carbon Solutions, LLC, Littleton, CO (US)

(72) Inventors: Mowen Li, Highlands Ranch, CO (US); Sarah G. McMurray, Edgewater, CO (US); Robert B. Huston, Longmont, CO (US); Joseph M. Wong, Castle Pines, CO (US)

(73) Assignee: ADA Carbon Solutions, LLC, Littleton, CO (US)

( * ) Notice: Subject to any disclaimer, the term of this patent is extended or adjusted under 35 U.S.C. 154(b) by 615 days.

(21) Appl. No.: 14/957,552

(22) Filed: Dec. 2, 2015

(65) Prior Publication Data

US 2016/0214078 A1 Jul. 28, 2016

Related U.S. Application Data

(60) Provisional application No. 62/086,292, filed on Dec. 2, 2014.

(51) Int. Cl.
*B01J 20/20* (2006.01)
*B01J 20/28* (2006.01)
*B01J 20/10* (2006.01)

(52) U.S. Cl.
CPC ........... *B01J 20/20* (2013.01); *B01J 20/2803* (2013.01); *B01J 20/28004* (2013.01); *B01J 20/28016* (2013.01); *B01J 2220/42* (2013.01)

(58) Field of Classification Search
CPC .... B01J 20/20; B01J 20/28004; B01J 20/016; B01J 20/28016; B01J 20/2803; B01J 2220/42
USPC ........................................................ 252/193
See application file for complete search history.

(56) References Cited

U.S. PATENT DOCUMENTS

| | | | |
|---|---|---|---|
| 2,792,074 A | 5/1957 | Schilb et al. | |
| 5,505,766 A | 4/1996 | Chang | |
| 6,451,094 B1 | 9/2002 | Chang et al. | |
| 6,558,454 B1 | 5/2003 | Chang et al. | |
| 6,719,828 B1 | 4/2004 | Lovell et al. | |
| 8,080,088 B1 * | 12/2011 | Srinivasachar | B01D 53/02 502/417 |
| 9,314,767 B2 | 4/2016 | McMurray et al. | |
| 9,468,904 B2 | 10/2016 | McMurray et al. | |
| 9,539,538 B2 | 1/2017 | Wong et al. | |
| 9,561,462 B2 | 2/2017 | McMurray et al. | |
| 10,035,126 B2 | 7/2018 | McMurray et al. | |
| 10,137,403 B2 | 11/2018 | McMurray et al. | |
| 10,159,928 B2 | 12/2018 | McMurray | |
| 10,307,706 B2 | 6/2019 | Li et al. | |
| 10,421,037 B2 | 9/2019 | Li et al. | |
| 10,449,492 B2 | 10/2019 | Huston et al. | |
| 10,456,745 B2 | 10/2019 | Huston et al. | |
| 2007/0254807 A1 | 11/2007 | Bisque et al. | |
| 2010/0202946 A1 * | 8/2010 | Yang | B01D 53/64 423/215.5 |
| 2014/0186625 A1 | 7/2014 | Wong et al. | |
| 2014/0191157 A1 | 7/2014 | Wong et al. | |
| 2014/0255279 A1 * | 9/2014 | Olson | B01D 53/02 423/210 |
| 2015/0165416 A1 | 6/2015 | Wong et al. | |
| 2015/0235326 A1 | 8/2015 | Hansen et al. | |
| 2016/0296908 A1 | 10/2016 | Li et al. | |
| 2017/0043316 A1 | 2/2017 | Li et al. | |
| 2017/0043321 A1 | 2/2017 | Li et al. | |
| 2018/0001257 A1 | 1/2018 | Wong et al. | |
| 2018/0028970 A1 | 2/2018 | Huston et al. | |
| 2018/0029006 A1 | 2/2018 | Li et al. | |
| 2018/0029008 A1 | 2/2018 | Li et al. | |
| 2018/0029009 A1 | 2/2018 | Li et al. | |
| 2018/0170773 A1 | 6/2018 | Mitchek et al. | |
| 2019/0291041 A1 | 9/2019 | McMurray et al. | |
| 2019/0358578 A1 | 11/2019 | McMurray et al. | |
| 2020/0001228 A1 | 1/2020 | Li et al. | |
| 2020/0047107 A1 | 2/2020 | Cayton | |

OTHER PUBLICATIONS

U.S. Appl. No. 62/005,304, filed May 30, 2014.
Official Action for U.S. Appl. No. 15/729,364, dated Oct. 22, 2019 6 pages.
U.S. Appl. No. 16/657,634, filed Oct. 18, 2019, Huston et al.
U.S. Appl. No. 16/725,993, filed Dec. 23, 2019, Huston et al.

\* cited by examiner

*Primary Examiner* — Ronald Grinsted
(74) *Attorney, Agent, or Firm* — Sheridan Ross P.C.

(57) ABSTRACT

A sorbent composition for enhanced baghouse function is described. The composition may include a sorbent such as powder activated carbon as well as an additive that is a heat moderator or a permeability agent. The heat moderator may act as a heat sink or barrier. Heat moderators may include in non-limiting examples phyllosilicates, cyclosilicates, or nesosilicates that may include, montmorillonite, bentonite, halloysite, aluminum silicates, muscovite, illite, kaolin, andalusite, kyanite, sillimanite, metakaolin, mullite, polymers, such as chitosan, and/or clays, either natural or synthetic (e.g., montmorillonite), or polyethylenimine. Permeability may be affected by mixing sorbents of lower D50 with sorbents of higher D50 in various ratios, or addition of a permeability agent such as a phyllosilicate, perlite, silica, diatomaceous earth. Further, a permeability agent such as a fluoropolymer may be coated onto or admixed with the sorbent. Diatomaceous earth, perlites, or silicates may also increase permeability. The compositions are particularly useful in flue gas treatment systems with baghouse separation units in that they have reduced combustibility and increased permeability properties.

30 Claims, 11 Drawing Sheets

SORBENT COMPOSITION FOR USE IN A FLUE GAS TRAIN INCLUDING A BAGHOUSE

CROSS-REFERENCE TO RELATED APPLICATION

This application claims the priority benefit of U.S. Provisional Patent Application No. 62/086,292 filed on Dec. 2, 2014, entitled "SORBENT COMPOSITION FOR USE IN A FLUE GAS TRAIN INCLUDING A BAGHOUSE," which is incorporated herein by reference in its entirety.

FIELD

This disclosure relates to the field of sorbent compositions that improve the performance of baghouse units of flue gas stream air pollution control systems.

BACKGROUND

A baghouse ("BH") unit, also called a fabric filter unit, is used as an air pollution control device and functions to capture particulate matter from flue gas streams of coal-fired electricity generating plants or waste-burning industrial boilers. Particulate matter in flue gas streams may include fly ash from the boiler, sorbents and other conditioning agents added to capture contaminants in the stream such as mercury, hydrochloric acid (HCl), bromine, and others. BH units are highly efficient particulate collection devices, operating effectively in a broad range of incoming loading or particle size. Further, BH units may serve as dry collection devices for removing contaminant gases and heavy metals via increased exposure to adsorbents. Recently many sites have begun to use the TOXECON™ system that utilizes both an electrostatic precipitator ("ESP") and BH unit. In this system, a sorbent, used to capture especially mercury, is injected downstream from the ESP unit such that fly ash can be collected in the ESP and sold to concrete producers. BH units in these systems serve to capture remaining particulate matter, sorbent, and contaminants from the flue gas stream prior to emission from the stack serving as the last emission control device. The TOXECON™ system is described in U.S. Pat. No. 5,505,766 by Chang, which is incorporated herein by reference in its entirety.

In the United States and Canada, federal and state/provincial regulations have been implemented or are being considered to reduce mercury emissions, particularly from coal-fired power plants, steel mills, cement kilns, waste incinerators and boilers, industrial coal-fired boilers, and other coal-combusting facilities. For example, the United States Environmental Protection Agency (U.S. EPA) has promulgated Mercury Air Toxics Standards (MATS), which would among other things require coal-fired power plants to capture at least approximately 80% to 90% of their mercury emissions. The rule applies to four pollutant classes: mercury (Hg), acid gasses such as sulfur dioxide ($SO_2$) and hydrochloric acid (HCl), filterable particulate matter (fPM), and non-mercury metals.

The leading sorbent for mercury control from coal-fired power plants is activated carbon. Activated carbon, particularly powder activated carbon ("PAC"), can be injected into the flue gas emitted by the boiler of a power plant. PAC is a porous carbonaceous material having a high surface area, which exposes significant amounts of beneficial chemically functional and reaction sites and which creates high adsorptive potential for many compounds, including capturing mercury from the flue gas.

SUMMARY

In one embodiment, a sorbent composition that enhances baghouse unit performance is disclosed. The sorbent composition includes a sorbent having a median particle diameter (D50) of not greater than about 30 μm, and at least a first heat moderator.

A number of characterizations, refinements, enhancements and additional features are applicable to this embodiment of a sorbent composition that enhances baghouse unit performance. These characterizations, refinements, enhancements and additional features are applicable to this embodiment of a sorbent composition individually or in any combination.

In one characterization of the sorbent composition that enhances baghouse unit performance, the first heat moderator is selected from the group consisting of phyllosilicates, cyclosilicates, nesosilicates, colloidal silicates, aluminum silicates, mullite, perlite, organo-halogens, organo-phosphates, sodium sulfite, organic phosphinates, and combinations thereof.

In one particular example, the first heat moderator comprises a phyllosilicate. In one characterization of this example, the phyllosilicate is selected from the group consisting of kaolin, montmorillonite, illite, vermiculite, muscovite, kyanite, sillimanite, metakaolin, aluminum phyllosilicates, and combinations thereof. In one exemplary composition, the phyllosilicate comprises a montmorillonite (e.g., natural or synthetic montmorillonite).

In another example, the first heat moderator comprises an aluminum silicate. In one characterization, the aluminum silicate is selected from the group consisting of zeolites, halloysite, andalusite, kyanite, sillimanite, kaolin, metakaolin, mullite, feldspar group minerals, and combinations thereof. In one particular form, the aluminum silicate comprises halloysite. In another particular form, the aluminum silicate comprises andalusite.

In another example, the first heat moderator comprises an aluminum phyllosilicate. In one characterization, the aluminum phyllosilicate comprises bentonite.

In another example, the first heat moderator comprises a nesosilicate. In another example, the heat moderator comprises an organic phosphinate. In yet another example, the heat moderator comprises sodium sulfite.

In another characterization of the sorbent composition that enhances baghouse unit performance, the sorbent composition further comprises a binding agent. In one example of this embodiment, the binding agent comprises a polymer that forms a charged species in water. In one characterization, the polymer that forms a charged species in water comprises a polysaccharide. In one particular characterization, the polysaccharide is selected from the group consisting of chitosan, dextran, cyclodextrin and cellulose. In another characterization, the polymer that forms a charged species in water is selected from the group consisting of polyamines, polyacrylates and polyacrylamides. In one form, the polymer is a polyamine that is selected from the group consisting of poly aminoester, and polyethylenimine. In another form, the polymer is the polyacrylamide poly[2-(N,N-dimethylamino)ethyl methacrylate. In one example of the sorbent composition that further comprises a binding agent, the heat moderator is coated onto the sorbent. In another example of the sorbent composition that further comprises a binding agent, the heat moderator is coated onto the binding agent.

In one example of a sorbent composition that further comprises a binding agent, the first heat moderator is selected from the group consisting of phyllosilicates, cyclosilicates, nesosilicates, colloidal silicates, aluminum silicates, mullite, perlite, organo-halogens, organo-phosphates, sodium sulfite, organic phosphinates, and combinations thereof. In one characterization, a second heat moderator is coated onto the first heat moderator, wherein the second heat moderator is selected from the group consisting of phyllosilicates, cyclosilicates, nesosilicates, colloidal silicates, aluminum silicates, mullite, perlite, organo-halogens, organo-phosphates, sodium sulfite, organic phosphinates, and combinations thereof. In one form of this characterization of the sorbent composition, a third heat moderator is coated onto the second heat moderator, wherein the third heat moderator is selected from a group consisting of phyllosilicates, cyclosilicates, nesosilicates, colloidal silicates, aluminum silicates, mullite, perlite, organo-halogens, organo-phosphates, sodium sulfite, organic phosphinates, and combinations thereof. In some forms, a fourth layer of a heat moderator is coated onto the third heat moderator, wherein the fourth heat moderator is selected from a group consisting of phyllosilicates, cyclosilicates, nesosilicates, colloidal silicates, aluminum silicates, mullite, perlite, organo-halogens, organo-phosphates, sodium sulfite, organic phosphinates, and combinations thereof.

In another characterization of the sorbent composition that enhances baghouse unit performance, the heat moderator is present in the composition at a concentration of at least about 0.5 wt. % and not greater than about 20 wt. %. In another embodiment, the binding agent is present in the composition at a concentration of at least about 0.05 wt. % and not greater than about 10 wt. %.

In another characterization of the sorbent composition that enhances baghouse unit performance, the sorbent composition comprises an oxidizing agent. In one example, the oxidizing agent comprises an inorganic halogen salt. In one characterization of this example, the inorganic halogen salt is selected from the group consisting of alkali metal compounds and alkaline earth metal compounds. In one form, the alkali metal compound or alkali earth metal compound is selected from the group consisting of calcium hypochlorite, calcium hypobromite, calcium hypoiodite, calcium chloride, calcium bromide, calcium iodide, magnesium chloride, magnesium bromide, magnesium iodide, sodium chloride, sodium bromide, sodium iodide, potassium chloride, potassium bromide, potassium iodide and combinations thereof.

In another characterization of the sorbent composition that enhances baghouse unit performance, the composition further comprises a catalytic phase metal wherein the catalytic phase metal is selected from the group consisting of Fe, Cu, Mn, Pd, Au, Ag, Pt, Ir, V, Ni, Zn, Sn, Ti, Ce, and mixtures thereof.

In another characterization of the sorbent composition that enhances baghouse unit performance, the composition further comprises an acid gas agent, the acid gas agent comprising a trivalent or higher Group 3 to Group 14 metal-containing compound selected from the group consisting of a carbonate, an oxide, a hydroxide, an ionic salt precursor to a hydroxide and combinations thereof. In one example of this characterization, the acid gas agent comprises aluminum hydroxide.

In another characterization of the sorbent composition that enhances baghouse unit performance, the composition further comprises a flow aid, wherein the flow aid is selected from the group consisting of graphite, talc, mica and combinations thereof. In one example of this characterization, the flow aid comprises graphite.

In another characterization of the sorbent composition that enhances baghouse unit performance, the wt. % of the sorbent having a size of less than 5 µm comprises not more than about 10 wt. % of the total composition.

In another characterization of the sorbent composition that enhances baghouse unit performance, the composition further comprises a permeability additive, wherein the permeability additive is selected from the group consisting of perlite, silica, diatomaceous earth, zeolites, and combinations thereof.

In another characterization of the sorbent composition that enhances baghouse unit performance, the sorbent has a median particle diameter of not greater than about 15 µm. In one example, the sorbent has a median particle diameter of not greater than about 12 µm.

In another characterization of the sorbent composition that enhances baghouse unit performance, the specific enthalpy of the composition is at least about 10% less than the specific enthalpy of a composition that consists essentially of the sorbent. In one example, the specific enthalpy of the sorbent composition is at least about 15% less than the specific enthalpy of a composition that consists essentially of the sorbent. In another example, the specific enthalpy of the composition is at least about 20% less than the specific enthalpy of a composition that consists essentially of the sorbent.

In another embodiment, a composition that enhances baghouse unit performance is disclosed, where the composition comprises a sorbent having a median particle diameter (D50) of not greater than about 30 µm, and comprises a permeability additive. In one characterization, the permeability additive is selected from the group consisting of perlite, silica, diatomaceous earth, zeolite and combinations thereof.

In another embodiment, a composition that enhances baghouse unit performance is disclosed, wherein the composition comprises a sorbent having a median particle diameter (D50) of not greater than about 30 µm, and comprises a surface agent.

A number of characterizations, refinements, enhancements and additional features are applicable to this embodiment of a sorbent composition that enhances baghouse unit performance and comprises a surface agent. These characterizations, refinements, enhancements and additional features are applicable to this embodiment of a sorbent composition individually or in any combination.

In one characterization, the surface agent comprises a fluoropolymer. According to one refinement of this characterization, the fluoropolymer is selected from the group consisting of polytetrafluoroethylene (PTFE), polyvinyl fluoride (PVF), polyvinylidene fluoride (PVDF), polychlorotrifluoroethene (PCTFE), perfluoroalkoxy alkane (PFA), fluorinated ethylene propylene (FEP), ethylene tetrafluoroethylene (ETFE), ethylene chloro trifluoroethylene (ECTFE), fluorocarbon [chlorofluortrifluoroethylenevinylidene fluoride] (FPM/FKM), perfluoropolyether (PFPE), perfluorosulfonic acid (PFSA), and combinations or derivatives thereof.

In another characterization, the composition further comprises an oxidizing agent. In one example, the oxidizing agent comprises an inorganic halogen salt. In one refinement of this example, the inorganic halogen salt is selected from the group consisting of alkali metal compounds and alkaline earth metal compounds. In a further refinement, the alkali metal compound or alkaline earth metal compound is selected from the group consisting of calcium hypochlorite, calcium hypobromite, calcium hypoiodite, calcium chloride, calcium bromide, calcium iodide, magnesium chloride, magnesium bromide, magnesium iodide, sodium chloride, sodium bromide, sodium iodide, potassium chloride, potassium bromide, potassium iodide and combinations thereof.

In another characterization of this embodiment of a composition that enhances baghouse unit performance, the composition further comprises a catalytic phase metal wherein the catalytic phase metal is selected from the group consisting of Fe, Cu, Mn, Pd, Au, Ag, Pt, Ir, V, Ni, Zn, Sn, Ti, Ce, and mixtures thereof. In yet another characterization of this embodiment of a composition that enhances baghouse unit performance, the composition further comprises an acid gas agent, the acid gas agent comprising a trivalent or higher Group 3 to Group 14 metal-containing compound selected from the group consisting of a carbonate, an oxide, a hydroxide, an ionic salt precursor to a hydroxide and combinations thereof. In one example, the acid gas agent comprises aluminum hydroxide.

In another characterization of this embodiment of a composition that enhances baghouse unit performance, the composition further comprises a flow aid, wherein the flow aid is selected from the group consisting of graphite, talc, mica and combinations thereof. In one example, the flow aid comprises graphite.

In another characterization of this embodiment of a composition that enhances baghouse unit performance, the wt. % of the sorbent having a size of less than 5 µm comprises not more than about 10 wt. % of the total composition. In yet another characterization of this embodiment of a composition that enhances baghouse unit performance, the composition further comprises a permeability additive, wherein the permeability additive is selected from the group consisting of perlite, silica, diatomaceous earth, zeolites, and combinations thereof. In another characterization of this embodiment of a composition that enhances baghouse unit performance, the composition further comprise a heat moderator selected from the group consisting of phyllosilicates, cyclosilicates, nesosilicates, colloidal silicates, aluminum silicates, mullite, perlite, organo-halogens, organo-phosphates, sodium sulfite, organic phosphinates, and combinations thereof. In one example, the sorbent composition of this characterization further comprises a binding agent, wherein the binding agent comprises a polymer that forms a charged species in water.

In another characterization of this embodiment of a composition that enhances baghouse unit performance, the sorbent has a median particle diameter of not greater than about 15 µm. In one refinement, the sorbent has a median particle diameter of not greater than about 12 µm.

In another embodiment of this disclosure, a composition that enhances baghouse unit performance is disclosed, wherein the composition is a mixture of at least a first sorbent and a second sorbent, the first sorbent having a median particle diameter of not greater than about 30 µm and at least about 20 µm, and the second sorbent having a median particle diameter of not greater than about 20 µm and at least about 8 µm, wherein the median particle diameter of the second sorbent is less than the median particle diameter of the first sorbent.

A number of characterizations, refinements, enhancements and additional features are applicable to this embodiment of a sorbent composition that enhances baghouse unit performance and comprises a surface agent. These characterizations, refinements, enhancements and additional features are applicable to this embodiment of a sorbent composition individually or in any combination.

In one characterization of this embodiment, the first sorbent and the second sorbent comprise substantially the same sorbent material. In another characterization, the difference in median particle diameter between the first sorbent and the second sorbent is at least about 5 µm. In one example of this characterization, the weight ratio of the first sorbent to the second sorbent is not greater than about 5:1. In another example, the weight ratio of the first sorbent to the second sorbent is not greater than about 4:1. In another characterization, the weight ratio of the first sorbent to the second sorbent is at least about 1:6. In yet another characterization, the weight ratio of the first sorbent to the second sorbent is at least about 1:1. In yet another characterization, the weight ratio of the first sorbent to the second sorbent is at least about 2:1.

In another characterization of this composition that enhances baghouse unit performance, the composition further comprises an oxidizing agent. In one example, the the oxidizing agent comprises an inorganic halogen salt. In a further refinement of this example, the inorganic halogen salt is selected from the group consisting of alkali metal compounds and alkaline earth metal compounds. In yet a further refinement, the alkali metal compound or alkaline earth metal compound is selected from the group consisting of calcium hypochlorite, calcium hypobromite, calcium hypoiodite, calcium chloride, calcium bromide, calcium iodide, magnesium chloride, magnesium bromide, magnesium iodide, sodium chloride, sodium bromide, sodium iodide, potassium chloride, potassium bromide, potassium iodide and combinations thereof.

In another characterization of this composition that enhances baghouse unit performance, the composition further comprises a catalytic phase metal wherein the catalytic phase metal is selected from the group consisting of Fe, Cu, Mn, Pd, Au, Ag, Pt, Ir, V, Ni, Zn, Sn, Ti, Ce, and mixtures thereof.

In another characterization of this composition that enhances baghouse unit performance, the composition further comprises an acid gas agent, the acid gas agent comprising a trivalent or higher Group 3 to Group 14 metal-containing compound selected from the group consisting of a carbonate, an oxide, a hydroxide, an ionic salt precursor to a hydroxide and combinations thereof. In one example, the acid gas agent comprises aluminum hydroxide.

In another characterization of this composition that enhances baghouse unit performance, the composition further comprises a flow aid, wherein the flow aid is selected from the group consisting of graphite, talc, mica and combinations thereof. In one example, the flow aid comprises graphite.

In another characterization of this composition that enhances baghouse unit performance, the wt. % of the sorbent composition having a size of less than 5 µm comprises not more than about 10 wt. % of the total composition. In yet another characterization, the sorbent composition further comprises a permeability additive, wherein the permeability additive is selected from the group consisting of perlite, silica, diatomaceous earth, zeolites, and combinations thereof.

The foregoing embodiments of sorbent compositions may enhance baghouse unit performance by reducing the pressure drop across the baghouse filter, i.e., reduced pressure drop as compared to a composition that consists essentially of the sorbent. In one characterization, the pressure drop across the baghouse filter as measured in a permeability test under an applied normal stress of 15 kPa at an air velocity of 0.5 mm/s is not greater than about 85 mBar. In another characterization, the pressure drop across the baghouse filter as measured in a permeability test under an applied normal stress of 15 kPa at an air velocity of 0.5 mm/s is not greater than about 78 mBar. In another characterization, the pressure drop across the baghouse filter as measured in a permeability test under an applied normal stress of 15 kPa at an air velocity of 0.5 mm/s is not greater than about 65 mBar. In yet another characterization, the pressure drop across the baghouse filter as measured in a permeability test under an applied normal stress of 15 kPa at an air velocity of 0.5 mm/s is not greater than about 50 mBar.

In certain characterizations, the foregoing embodiments of sorbent compositions may enhance baghouse unit performance by reducing the heating of the composition as it resides on the baghouse filter. One technique to measure the heating capability of a sorbent composition is to measure the specific enthalpy and/or the specific heat capacity of the sorbent composition, i.e., as compared to the specific enthalpy of a composition that consists essentially of the sorbent. In one example, the specific enthalpy of the sorbent composition is at least about 10% less than a composition that consists essentially of the sorbent. In another characterization, the specific heat capacity of the sorbent composition at 160° C. is at least about 5% higher than a composition that consists essentially of the sorbent.

In one further characterization of the foregoing embodiments of a sorbent composition, the specific enthalpy of the sorbent composition is at least about 10% less than a composition that consists essentially of the sorbent, the specific heat capacity of the sorbent composition at 160° C. is at least about 10% higher than a composition that consists essentially of the sorbent; and the pressure drop across a baghouse filter of the sorbent composition as measured in a permeability test under an applied normal stress of 15 kPa at an air velocity of 0.5 mm/s is not greater than about 85 mBar.

In a further characterization of the foregoing embodiments of a sorbent composition, the specific enthalpy of the sorbent composition is at least about 10% less than a composition that consists essentially of the sorbent, the specific heat capacity of the sorbent composition at 160° C. is at least about 10% higher than a composition that consists essentially of the sorbent, and the pressure drop across a baghouse filter of the sorbent composition as measured in a permeability test under an applied normal stress of 15 kPa at an air velocity of 0.5 mm/s is not greater than about 78 mBar.

In a further characterization of the foregoing embodiments of a sorbent composition, the specific enthalpy of the sorbent composition is at least about 10% less than a composition that consists essentially of the sorbent, the specific heat capacity of the sorbent composition at 160° C. is at least about 10% higher than a composition that consists essentially of the sorbent, and the pressure drop across a baghouse filter of the sorbent composition as measured in a permeability test under an applied normal stress of 15 kPa at an air velocity of 0.5 mm/s is not greater than about 65 mBar.

In a further characterization of the foregoing embodiments of a sorbent composition, the specific enthalpy of the sorbent composition is at least about 10% less than a composition that consists essentially of the sorbent, the specific heat capacity of the composition at 160° C. is at least about 10% higher than a composition that consists essentially of the sorbent, and the pressure drop across a baghouse filter of the sorbent composition as measured in a permeability test under an applied normal stress of 15 kPa at an air velocity of 0.5 mm/s is not greater than about 50 mBar.

In another embodiment of this disclosure, a method for making a sorbent composition having low self-heating properties is disclosed. The method comprises the steps of mixing a sorbent with at least a first heat moderator to form the sorbent composition, wherein the first heat moderator is selected from the group consisting of phyllosilicates, cyclosilicates, nesosilicates, colloidal silicates, aluminum silicates, mullite, perlite, organo-halogens, organo-phosphates, sodium sulfite, organic phosphinates, and combinations thereof, and wherein the sorbent has a median particle diameter (D50) of not greater than about 30 μm.

A number of characterizations, refinements, enhancements and additional features are applicable to this embodiment of a sorbent composition that enhances baghouse unit performance and comprises a surface agent. These characterizations, refinements, enhancements and additional features are applicable to this embodiment of a sorbent composition individually or in any combination.

In one characterization, the first heat moderator comprises a phyllosilicate. In one example, the phyllosilicate is selected from the group consisting of kaolin, montmorillonite, illite, vermiculite, muscovite, kyanite, sillimanite, metakaolin, aluminum phyllosilicates, and combinations thereof. In one refinement, the phyllosilicate comprises a montmorillonite. In another characterization of the method for making a sorbent composition having low self-heating properties, the first heat moderator comprises an aluminum silicate. In one refinement, the aluminum silicate is selected from the group consisting of zeolites, halloysite, andalusite, kyanite, sillimanite, kaolin, metakaolin, mullite, feldspar group minerals, and combinations thereof. In another refinement, the aluminum silicate comprises halloysite. In yet another refinement, the aluminum silicate comprises andalusite.

In another characterization of the method for making a sorbent composition having low self-heating properties, the first heat moderator comprises an aluminum phyllosilicate. In one refinement, the aluminum phyllosilicate comprises bentonite. In another characterization of the method for making a sorbent composition having low self-heating properties, the first heat moderator comprises a nesosilicate. In yet another characterization, the heat moderator comprises an organic phosphinate. In yet another characterization, the heat moderator comprises sodium sulfite.

In another characterization of the method for making a sorbent composition having low self-heating properties, a binding agent is first coated onto the sorbent, and the first heat moderator is coated onto the binding agent. In one example, the binding agent comprises a polymer that forms a charged species in water. In one refinement, the polymer comprises a polysaccharide. In yet a further refinement, the polysaccharide comprises a compound selected from the group consisting of chitosan, dextran, cyclodextrin, and cellulose. In another example, the polymer is selected from the group consisting of polyethylenes, polyacrylates, and polyacrylamines. In one refinement, the polymer is selected from the group consisting of polyethyleneimine and poly2 (N,N-dimethyl amino) ethyl methacrylate. In one characterization, an additional layer of a binding agent is coated onto the first heat moderator, and a second heat moderator is coated onto the additional layer of the binding agent, and wherein the second heat moderator is selected from the group consisting of phyllosilicates, cyclosilicates, nesosilicates, colloidal silicates, aluminum silicates, mullite, perlite, organo-halogens, organo-phosphates, sodium sulfite, organic phosphinates, and combinations thereof, and wherein the first and second heat moderators may be the same or different.

In another embodiment, a method for producing a sorbent composition having low self-heating properties is disclosed. The method comprises the steps of: (a) coating a sorbent with a binding agent, wherein the binding agent is selected from a group consisting of polymers that form a charged species in water, and wherein the sorbent has a median particle diameter (D50) of not greater than about 30 μm. The method further comprises the step (b) of coating the binding agent with at least a first heat moderator, wherein the heat moderator is selected from a group consisting of phyllosilicates, cyclosilicates, nesosilicates, colloidal silicates, aluminum silicates, mullite, perlite, organo-halogens, organo-phosphates, sodium sulfite, organic phosphinates, and combinations thereof.

In one characterization of this method for producing a sorbent composition having low self-heating properties, the steps (a) and (b) are repeated at least two times, and the heat moderator may be the same or different when steps (a) and (b) are repeated. In another characterization, steps (a) and (b) are repeated at least two times, and the heat moderator is different when steps (a) and (b) are repeated. In another characterization, steps (a) and (b) are repeated at least three times, and wherein the heat moderator may be the same or different when steps (a) and (b) are repeated.

In another characterization, the binding agent comprises chitosan, and the heat moderator comprises montmorillonite.

In another embodiment, a method for enhancing efficiency and safety of a baghouse unit is disclosed. The method comprises adding to a flue gas stream with an in-line baghouse unit, a sorbent composition, and capturing the sorbent composition in the baghouse unit. The sorbent composition may be any of the sorbent compositions disclosed herein.

In one characterization, the method for enhancing the efficiency and safety of a baghouse unit further comprises separately adding a permeability additive to the flue gas stream upstream from the baghouse unit. In another characterization, the permeability additive is selected from the group consisting of diatomaceous earth, perlite, silica, silicates and combinations thereof.

DETAILED DESCRIPTION

In many flue gas air pollution control trains a baghouse (BH) unit is used to remove the particulate matter including fly ash, dry sorbent injection (DSI) material, PAC, and/or other conditioning agents from the flue gas stream prior to the flue gas stream exiting through the stack. Although ESP units generally require a lower capital cost than BH units, BH units often are more efficient and increase the contact time between the sorbent (e.g., PAC) and the flue gases. Such increased contact times are often necessary to adequately capture mercury from the flue gas stream. Further, TOXECON™ systems, which employ an ESP to capture fly ash, and a subsequent BH to capture sorbents and control mercury emissions, are popular because utilities don't need to factor in compatibility of the sorbent with respect to sale of fly ash to concrete manufacturers. TOXECON™ systems and methods are described in more detail in U.S. Pat. No. 6,451,094 by Chang et al. and U.S. Pat. No. 6,558,454 by Chang et al., each of which is incorporated herein by reference in its entirety.

Figure 1:
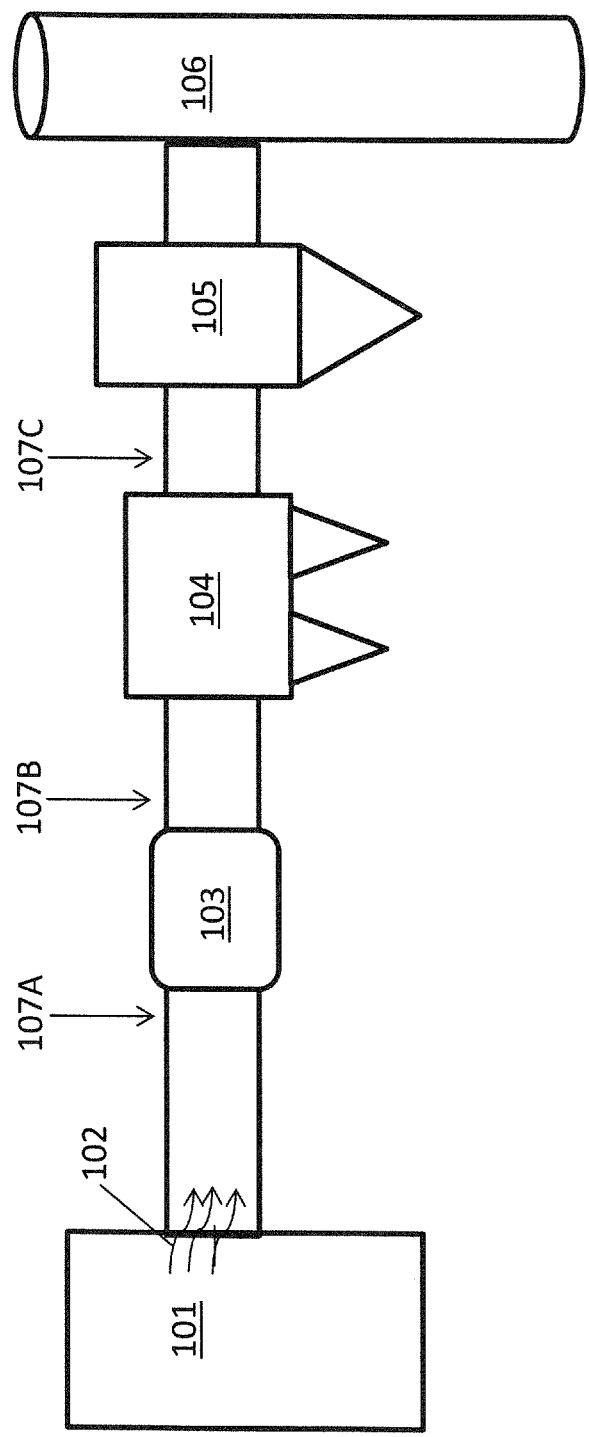
FIG. 1 illustrates a plant configuration and a method for the capture and sequestration of contaminants from a flue gas stream.

In one embodiment, a method for the treatment of the flue gas stream to remove mercury therefrom is provided. The method includes the step of contacting the flue gas stream with a sorbent composition, e.g., that is disclosed herein, such as the method and flue gas train illustrated in FIG. 1. Coal, gas, and/or other energy product is combusted in a boiler 101 producing a flue gas stream 102. As illustrated in FIG. 1, the flue gas stream 102 then proceeds through a set of pollution control devices which may include an air heater unit 103 where the temperature of the flue gas stream 102 is reduced. Thereafter, the flue gas stream 102 may be introduced to separation unit(s) which may include an electrostatic precipitator (ESP) 104, a fabric filter or baghouse (BH) unit 105, or both in sequence, such as for TOXECON™ systems as is illustrated FIG. 1. The BH unit 105 and/or ESP 104 along with the BH unit 105, remove particulate matter from the flue gas, before exiting out a stack 106. It will be appreciated by those skilled in the art that the train may include other devices not illustrated in FIG. 1, such as a selective catalytic reduction unit (SCR) and the like, and may have numerous other configurations. In order to capture mercury from the flue gas 102, a sorbent composition and other conditioning agents and/or dry sorbent injection (DSI) agents may be introduced to (e.g., injected into) the flue gas stream 102 either before 107A or after 107B the air heater unit 103, but before ESP separation unit 104 and/or the BH unit 105 which will remove the particulate DSI agents from the flue gas. Alternately, as with TOXECON™ systems, the DSI agents may be injected after 107C the ESP 104 but before the BH unit 105.

Figure 2:
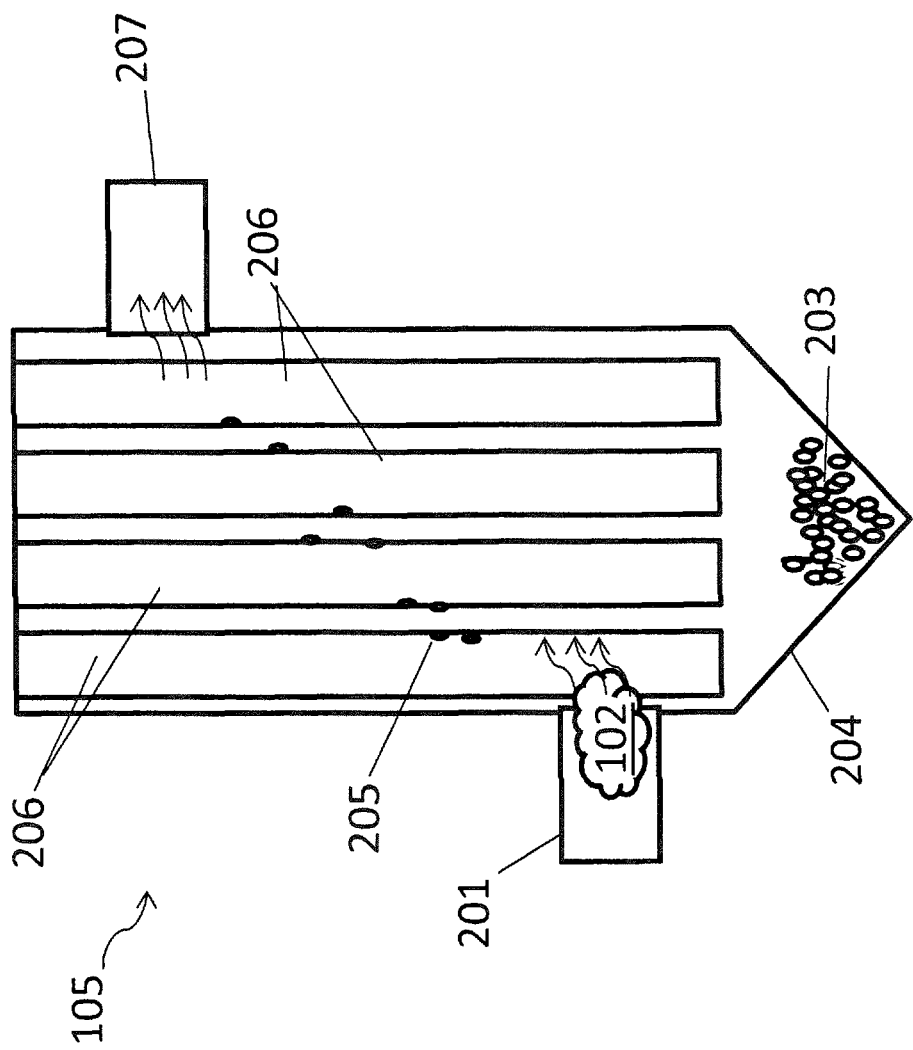
FIG. 2 illustrates a baghouse unit configuration and method of particulate matter capture.

FIG. 2 illustrates the configuration and operation of an example BH unit 105. BH units are classified by cleaning method, and three types of BH units predominate in the U.S.—reverse air (gas cleaning), pulse jet (compressed air cleaning) and shaker. Although different in some aspects, BH units have some common aspects that are illustrated in FIG. 2. An inlet 201 serves as a conduit to receive a flue gas stream 102 carrying particulate matter. Larger particulates 203, for example PAC having a particle diameter of greater than about 10 μm, may lose entrainment and fall out of the gas stream into the hopper 204 when the velocity of the stream is reduced. Finer particulates 205 (e.g., PAC, fly ash, dust, DSI particulates) that remain suspended in the stream are trapped/captured by the suspended fabric filter bags 206 and continue to be exposed to the flue gas 102 as the flue gas traverses the fabric filter bags 206. Filtered flue gas exits through an outlet 207 that may lead to other treatment units or to the stack. Particulates 205 collected on the fabric filter bags 206 are periodically removed from the filter surface via reverse air pulse or shaking such that the particulates are collected by gravity in the hopper 204 and are periodically transported out for disposal.

The BH unit illustrated in FIG. 2 is disclosed by way of example only, and the present disclosure encompasses the use of other types of BH units, i.e., other types of particulate removal devices incorporating filter bags. Such BH units may include different cleaning mechanisms such as reverse air, pulse jet and mechanical shaker. bar. See, for example, U.S. Pat. No. 2,792,074 by Schlib et al., which is incorporated herein by reference in its entirety.

There are several operational issues that may arise with respect to the use of a BH unit 105. One potential issue, especially in TOXECON™ systems, is that larger particulates 203, which may be predominately PAC, accumulate in the hopper 204 and pose a combustion threat. Combustion issues may arise due to adsorption of oxygen by the PAC sorbent or other carbonaceous materials that accumulate in the hopper 204, which releases heat (i.e., via the exothermic chemisorption of oxygen). When large amounts of oxygen are adsorbed in a short amount of time, the carbon can rapidly self-heat. The heat generated is difficult to dissipate because carbon inherently acts as an insulator, and thus temperatures can rise quickly, leading to dangerous conditions.

Sites that have BH units with such combustion issues may alter their process conditions by cleaning the BH hopper 204 more frequently to avoid sorbent buildup. Also, some BH unit configurations include a hopper heater to keep the flue gas at a minimum temperature to avoid condensation. In this instance, high temperatures may be mitigated by turning off the hopper heater. However, changing operating conditions and procedures can be time consuming and expensive and require additional training. Further, turning off the hopper heater may increase condensation. Additional issues arise if the flue gas is acidic since, at lower temperatures, the acidic flue gas may condense to form sulfuric acid and other liquids that can corrode plant equipment.

Another operational issue encountered with some BH units is that a cake layer (i.e., a filter cake) forms on the filter bags 206 due to deposition of the particulates 205. Because it is advantageous to keep the cake layer on the filter surface for enhanced mercury capture, and because cleaning of the filter accelerates filter wear, extending the cleaning cycle time (i.e., the time between cleanings of the fabric filter) is desirable. However, PAC and other dust particles build up on the filter bags 206 over time, eventually impeding the flow of air through the filter. In particular, PAC sorbents of reduced size, which are increasingly popular due to their enhanced ability to capture mercury in flue gas streams, may decrease BH unit cleaning cycle time because the permeability of the filter cake is rapidly decreased by the presence of such small particles in the filter cake, causing an undesirable pressure build-up. Further, DSI addition can also be counterproductive to BH function. Common DSI agents including trona, sodium bicarbonate, and hydrated lime react with the acid gas components of flue gas to form water, causing the filter cake to stick to the filter bags.

It would be advantageous to provide sorbent compositions that overcome one or more of the foregoing limitations of known sorbents (e.g., PAC), and that efficiently remove mercury from a flue gas stream, e.g., to meet governmental regulations for mercury emissions. Such sorbent compositions may exhibit improved permeability characteristics such that cleaning cycle times in the BH unit may be increased. Such sorbent compositions may ease the removal of the filter cake from the filter bag. Such sorbent compositions may exhibit reduced self-heating characteristics to reduce the possibility of combustion. Any one or any combination of the foregoing characteristics may be of benefit to mercury capture and/or to BH unit operations. In this regard, various embodiments of sorbent compositions having one or more of increased permeability (e.g., in the filter cake), lower self-heating, and/or greater resistance to water are provided in the present disclosure.

In one embodiment of the present disclosure, the sorbent composition includes a heat moderator that imparts low self-heating, e.g., reduced exothermic properties, as indicated by a reduced specific enthalpy, an increased specific heat capacity, a decreased heat release upon exposure to an $O_2$ environment, and/or an increased auto-ignition temperature for the sorbent composition, i.e., as compared to a sorbent composition that consists essentially of the sorbent. Carbon-based sorbents such as PAC generate heat when oxygen is chemisorbed by the carbon, and if this heat is not dissipated, the temperature of the sorbent will increase, potentially to the point of uncontrolled self-heating. The heat moderator may reduce the heating of the sorbent composition by absorbing heat, scavenging oxygen, creating air voids, and/or releasing water. In one characterization, the heat moderator is selected from the group consisting of phyllosilicates, cyclosilicates, nesosilicates, colloidal silicates, aluminum silicates, mullite, perlite, organo-halogens, organo-phosphates, sodium sulfite, organic phosphinates, and combinations thereof. In one refinement, the heat moderator comprises a phyllosilicate, and examples of useful phyllosilicates include, but are not limited to, kaolin, montmorillonite (e.g., natural or synthetic montmorillonite), illite, vermiculite, muscovite, kyanite, sillimanite, metakaolin, aluminum phyllosilicates, and combinations thereof. In another refinement, the heat moderator comprises an aluminum silicate, and examples of useful aluminum silicates include, but are not limited to, zeolites, halloysite, andalusite, kyanite, sillimanite, kaolin, metakaolin, mullite, feldspar group minerals, and combinations thereof. Among these, halloysite and andalusite may be particularly useful as a heat moderator. In another refinement, the heat moderator comprises an aluminum phyllosilicate, and useful examples of aluminum phyllosilicates include, but are not limited to, bentonite, or a nesosilicate. In another characterization the heat moderator may comprise an organic phosphate, an organic phosphinate and/or a sodium sulfite. Such organic compounds may advantageously form a char when heated.

The heat moderator may be in particulate form, and may be admixed with a particulate sorbent. In one characterization, the sorbent may be coated and/or impregnated with one or more heat moderators to enhance the thermal properties of the sorbent compositions. For example, the heat moderator may be coated onto the particulate sorbent as a solution (e.g., with dissolved components of the heat moderator) or as a slurry (e.g., with fine particulate solids of the heat moderator). The coated heat moderator(s) may act as heat sinks or oxygen barriers for the underlying sorbent In a particular example, the heat moderators coated and/or impregnated onto the sorbent may include clays, such as montmorillonite, bentonite, colloidal silica, or other compounds such as a tin alloy. Montmorillonite may be particularly useful as a heat moderator.

These heat moderators may be used alone or in combination with one another. For example, the sorbent composition may comprise a particulate sorbent that is admixed with one or more particulate heat moderators, e.g., a second heat moderator, a third heat moderator, or even more. In another example, the sorbent composition comprises a first heat moderator that is coated onto the sorbent and a second heat moderator that is coated onto the first heat moderator. In a further refinement, a third heat moderator is coated onto the second heat moderator. In yet a further refinement, a fourth heat moderator coated onto the third heat moderator.

In any event, the sorbent composition may comprise at least about 0.1 wt. %, such as at least about 0.5 wt. % of a heat moderator to ensure sufficient heat moderation/dissipation in the sorbent composition. Further, it is believed that amounts of heat moderator greater than about 20 wt. % of the sorbent composition may not be of further benefit for heat moderation and may begin to dilute the sorbent and decrease the ability of the sorbent composition to otherwise function, e.g., to capture mercury from the flue gas.

The sorbent composition may also include a binding agent to enhance the cohesiveness of the heat moderator on the sorbent, e.g., on a particulate sorbent. That is, a binding agent may be applied to (e.g., coated on) the particulate sorbent, with a heat moderator being coated (e.g., partially coated or fully coated) onto the binding agent. The binding agent may be a polymer, for example a polymer that readily forms ions (i.e., charged anionic or cationic species) when dissolved in water. Examples of such polymers include, but are not limited to, polysaccharides such as chitosan, dextran, cyclodextrin, and cellulose. Other examples include poly-L-lysine, polyamines, polyacrylates, and polyacrylamide. Examples of these may be poly aminoester, polyethylenimine, and poly[2-(N,N-dimethylamino)ethyl methacrylate. In one example, the binding agent is present in the sorbent composition at a concentration of at least about 0.05 wt. % and not greater than about 10 wt. %.

The sorbent compositions disclosed herein may have reduced self-heating or exothermal properties, e.g., as compared to the untreated particulate sorbent. These properties may include a reduced specific enthalpy (H), or total energy, in joules per gram (J/g), which is the total energy of a thermodynamic system including internal energy and thermodynamic potential. The specific enthalpy or energy change may be measured by differential scanning calorimetry ("DSC") using a DSC instrument such as the TA Instruments Q2000 differential scanning calorimeter (TA Instruments, New Castle, Del.) using heat flow measurements. The specific enthalpy may be calculated when heat is released by a material undergoing a chemical reaction, for example upon oxidation. DSC may be used to detect the heat released after the environment changes from being inert (e.g., about 100% $N_2$) to 100% oxygen at a certain temperature, here being 150° C. to 160° C. In a sorbent composition with reduced self-heating properties, the specific enthalpy should be less negative than the untreated sorbent such that less heat is released and therefore less heat is stored in the sample.

Heat capacity is a measurable physical quantity, namely the ratio of the heat energy that is required to change the temperature of an object or body to the total temperature change ($\Delta T$) of the object or body, and is normally reported in joule/degree Kelvin (K) or Celsius (C). Specific heat capacity (Cp), also known as specific heat, is the heat capacity per unit mass of material. Specific heat capacity may also be calculated from the specific enthalpy measured by the DSC instrument. In a sorbent composition with decreased self-heating properties the specific heat capacity should be increased, in that it takes more energy to raise the temperature of a given mass of the sorbent composition. In one characterization, the specific heat capacity of the sorbent composition at 160° C. is at least about 5% higher in joules per gram per ° C. (J/g ° C.) than the specific heat capacity of the sorbent composition prior to addition of a heat moderator(s), e.g., a sorbent composition that consists essentially of the sorbent. In further refinements, the specific heat capacity of the sorbent composition at 160° C. is at least about 10% higher, such as at least about 30% higher or even at least about 60% higher.

The heat moderators disclosed above may act as a heat sink or oxygen barrier material, reducing specific enthalpy of the sorbent, and therefore reducing self-heating potential. The effectiveness of a heat sink or oxygen barrier material, and therefore the reduced exothermal properties of the sorbent compositions, can be determined by the amount of heat release. The sorbent compositions disclosed herein may have lower self-heating characteristics in that they will hold less heat, and therefore the heat released and the specific enthalpy of the sorbent composition will be decreased.

In one characterization, the sorbent composition has a reduced specific enthalpy as compared to the sorbent without the addition of an additive. For example, in one embodiment the sorbent composition has a specific enthalpy that is at least about 10% less than the specific enthalpy of a composition that consists essentially of the sorbent. In another embodiment, the specific enthalpy of the sorbent composition is at least about 15%, such as at least about 20%, or even at least about 25% less than a composition that consists essentially of sorbent, e.g., before addition of a heat moderator.

Thermal gravimetric analysis (TGA) is a method of thermal analysis in which changes in the mass of materials are measured as a function of temperature, e.g., at a constant heating rate. TGA can be used to evaluate the thermal stability of a material. In a desired temperature range, if a species is thermally stable, there will be substantially no observed mass change. Negligible mass loss corresponds to little or no slope in the TGA trace. Here, the mass of a sorbent composition may be measured over time, with heating first to about 120° C. in the presence of nitrogen ($N_2$) gas, then to about 150° C., followed by a change to a 100% oxygen ($O_2$) environment. A change in weight of a sorbent composition upon heating to 120° C. is attributed to water release. The amount of $O_2$ adsorbed by the material upon change to a 100% $O_2$ environment is calculated. Amount of $O_2$ adsorbed correlates to the susceptibility of the sorbent composition to be oxidized. Compositions that have an increased ability to be oxidized may have an increased tendency to ignite at lower temperatures due to the exothermic nature of oxidation.

Further, the sorbent compositions may have an increased auto-ignition temperature, which can be measured in a test based on the Frank-Kamenetskii theory. The Frank-Kamenetskii theory allows for the temperature gradient of a mass or bulk of a substance to be taken into account. If the material is a good thermal insulator, heat will be trapped inside even if there is a high surface area. The sorbent compositions can be tested for heat build-up within a bulk sample by using this test. For this test, a four inch cube is filled with a test sample and is placed in a heated environment such as an oven. Temperature is measured at different points within the cube being a top portion, middle, and bottom portion, as well the ambient temperature surrounding the cube. The temperature at which the sorbent composition burns within a twenty-four hour period is described as the auto-ignition temperature. In one embodiment, sorbent compositions of the present disclosure have an auto-ignition temperature that is at least about 4% higher, or even 8% higher than a non-treated composition, e.g., than a composition that consists essentially of the sorbent.

As is discussed above, another issue that may affect the efficiency of a BH unit is the rapid formation of a filter cake which decreases the permeability of the flue gas through the filter. There are several approaches to mitigating filter cake permeability issues in accordance with the present disclosure and these approaches may be implemented individually or in combination to mitigate filter cake permeability issues. In one example, particulate sorbents of various sizes may be mixed in order to increase particle-particle void fraction and/or decrease packing of particles. For instance a sorbent with relatively higher median particle diameter (D50), such as about 20 μm to 30 μm vs. about 8 μm to 14 μm, may be utilized with the smaller size sorbent to create a more permeable filter cake, reducing the pressure drop and therefore allowing more air flow through the filters at similar or higher loading of the sorbent composition in the filter. Consequently, as an example, mixing a batch of a first sorbent having a D50 of from about 20 μm to about 30 μm, such as about 25 μm, with a batch of a second sorbent that has a D50 of not greater than about 20 μm, such as not greater than about 15 μm, or even not greater than about 10 μm, may offer increased permeability but still offer some of the advantages of the increased mercury capture efficiency of smaller D50 PAC. As such, a first sorbent, having a large D50 of between about 20 and 30 μm, may be mixed with a second sorbent having a smaller D50 of less than about 20 μm, or even less than about 15 μm, in ratios such as about 5:1 (large:small), or 4:1, or 3:1, or even 2:1, or 1:1. Described another way, the sorbent composition may have a multi-modal (e.g., bimodal) particle size distribution. In one characterization, the first mode of the bimodal size distribution may have a median particle diameter of at least about 20 μm and not greater than about 30 μm. The second mode of the bimodal particle size distribution may have a median particle diameter of at least about 8 μm and not greater than 20 μm, where the first mode is larger than the second mode. For example, the difference in median particle diameter between the first mode and the second mode may be at least about 5 μm. The first and second sorbents may be the same material, or may be comprised of different materials, and in one embodiment the first and second sorbents are both PAC having similar porosity characteristics.

In a second example, the surface of the particles may be altered to reduce gas-particle friction or resistance between particles increasing permeability and/or reducing pressure drop across the filter by decreasing cohesion of the particles so that they slide more easily against each other, against other particles, or against another surface. This may be achieved using a surface agent that either is coated onto or is admixed with the sorbent composition. Such a surface agent may reduce friction and may offer some additionally beneficial properties such as tolerance to $SO_3$ while still maintaining functionality of oxidizing $Hg^0$ species to $Hg^{+2}$ species that are easier to capture. In an example, the surface agent may be fluoropolymer with multiple carbon-fluorine bonds. The polymer may be coated onto the sorbent such as is described above or mixed with the sorbent with a high intensity mixer or used with the sorbent in a fluidized bed. The polymer may be a hydrophobic, aqueous-based polymer that may protect the sorbent from acids in the flue gas stream, such as $SO_3$. This may allow efficient mercury capture while also providing a sorbent composition that is less cohesive and shows a reduced pressure drop in a BH unit. Examples of such fluoropolymers include, but are not limited to, polytetrafluoroethylene (PTFE), polyvinylfluoride (PVF), polyvinylidenefluoride (PVDF), polychlorotrifluoroethene (PCTFE), perfluoroalkoxy alkane (PFA), fluorinated ethylene propylene (FEP), ethylene tetrafluoroethylene (ETFE), ethylene chloro trifluoroethylene (ECTFE), fluorocarbon [chlorofluortrifluoroethylenevinylidenefluoride] (FPM/FKM), perfluoropolyether (PFPE), perfluorosulfonic acid (PFSA), or combinations or derivatives thereof.

Yet another way to reduce pressure drop and/or increase permeability of the filter cake layer is through the addition of a permeability additive to the sorbent composition. The permeability additives may be those disclosed as surface agents, or may comprise materials such as diatomaceous earth, perlite (e.g., expanded perlite), silicas and/or silicates, zeolite, or the like, that effectively increase the porosity of the filter cake. Such permeability additives may create air channels in the filter cake that allow air flow through the cake, lengthening the time between necessary cake filter cleanings, thereby decreasing down time of the BH unit. Creation of air channels may also lead to enhanced heat dissipation through the filter cake. When utilized, the sorbent composition may include at least about 0.5 wt. % of the permeability additive, and may include not greater than about 10 wt. % of the permeability additive.

Any of the foregoing approaches to enhance permeability of the filter cake may be utilized, alone or in combination. The permeability of the sorbent compositions, i.e. that include a permeability additive or surface agent, and/or have a multi-modal size distribution, may be measured in a permeability test, which measures the pressure drop across a powder bed. Pressure drop is a measure of the resistance to air flow between particles and through the filter cake (e.g., a powder bed). The pressure drop according to the present disclosure, including the claims, is measured with the FT4 Powder Rheometer using a permeability test which measures the pressure drop across the powder bed as a function of the applied normal stress (kinematic) in kilopascal (kPa). The higher the pressure drop that is measured, the more likely the powder is to inhibit flow through the baghouse. Typically, a powder with low permeability will generate a pressure drop of over 50 mbar from 2 kPa to 15 kPa at an air velocity of 0.5 mm/s. In contrast, permeable powders will register a much lower pressure drop under these conditions.

The example sorbent compositions disclosed herein that are formed to have increased permeability may have a pressure drop as measured by the foregoing permeability test that is not greater than about 85 mBar under an applied normal stress of 15 kPa at an air velocity of 0.5 mm/s. In certain characterizations, the pressure drop under these conditions is not greater than about 78 mbar, such as not greater than about 65 mbar, such as not greater than about 50 mbar.

It will be appreciated that the sorbent compositions disclosed herein may be formulated to mitigate auto-ignition issues (e.g., to have decreased specific heat capacity), to mitigate filter cake permeability issues, or may be formulated to mitigate both auto-ignition issues and filter cake permeability issues. For example, the sorbent composition may include one or more heat moderators, either with or without a binding agent to enhance the adhesion of the heat moderator to the sorbent, and may also have mixed particle sizes to reduce particle-particle packing efficiency, increase particle-particle void space, and reduce cohesion with other particles and surfaces in order to increase permeability of the filter cake. In another embodiment, the sorbent composition is formulated to include one or more heat moderators and one or more surface agents to enhance permeability of the filter cake.

In one embodiment, a sorbent composition that enhances baghouse unit performance is provided, wherein the composition has at least a bimodal particle size distribution. In this embodiment, the sorbent composition is a mixture of at least a first sorbent and a second sorbent, where the first sorbent has a median particle diameter of not greater than about 30 μm and at least about 20 μm, and the second sorbent having a median particle diameter of not greater than about 20 μm and at least about 8 μm, where the second sorbent has a median particle diameter that is less than the median particle diameter of the first sorbent. Although described herein as comprising a first sorbent and a second sorbent, the first sorbent and the second sorbent may comprise substantially the same sorbent material, e.g., both the first and second sorbents may be PAC, where the two PACs have different particle size characteristics.

In one characterization, the difference in median particle diameter between the first mode and the second mode (e.g., between the first and second sorbent) is at least about 5 μm. In another aspect, the weight ratio of the first sorbent to the second sorbent is not greater than about 5:1, such as not greater than about 4:1. In another characterization, the weight ratio of the first sorbent to the second sorbent is at least about 1:6, such as at least about 1:1, or even at least about 2:1.

In addition to the foregoing, the sorbent compositions may include other additives, or be otherwise formulated, to enhance one or more properties of the sorbent composition that are not directly related to self-heating and/or permeability of the sorbent composition. In one example, a solid particulate flow aid may be admixed component with the sorbent compositions. Alternately, it is envisioned that these flow aids could be coated onto the sorbent composition from a liquid slurry or solution, or otherwise associated with the sorbent composition to provide enhanced flow characteristics, e.g., during pneumatic transport of the sorbent composition. These flow aids may be compounds selected from the group including silicates including phyllosilicates, minerals, graphite, and mixtures thereof. In one particular characterization, the flow aid may be selected from the group consisting of mica, talc, graphite, and mixtures thereof, and in another particular characterization the flow aid is graphite. The sorbent composition may be characterized as comprising not greater than about 10 wt. % of the flow aid, such as comprising not greater than about 5 wt. % of the flow aid or even comprising not greater than about 2 wt. % of the flow aid. Such flow aids are disclosed in more detail in commonly-owned U.S. patent application Ser. No. 14/145,731 by McMurray et al., which is incorporated herein by reference in its entirety. Other examples of flow aids include precipitated silica.

Further, a sorbent composition with a controlled particle size distribution may be employed to enhance the flow characteristics of the sorbent composition, e.g., during pneumatic transport. As such the sorbent composition may have reduced number of fine particles under about 5 μm. Such sorbent compositions are disclosed in more detail in commonly-owned U.S. patent application Ser. No. 14/201,398 by McMurray et al., which is incorporated herein by reference in its entirety. In one characterization, the wt. % of the sorbent particles having a size of less than 5 μm comprises not greater than about 10 wt. % of the total composition.

The sorbent composition also includes a sorbent (e.g., a particulate sorbent) that is selected to provide a large surface area for the mercury oxidation and to sequester the oxidized mercury from the flue gas stream. In one aspect, the sorbent may include fixed carbon such as a porous carbonaceous material (e.g., powder activated carbon) having a high surface area and well-controlled pore structure. For example, the carbonaceous material may be derived from coal, and in particular may be derived from lignite coal. In another characterization, the solid sorbent may comprise powdered activated carbon (PAC). The PAC may be formed from a variety of carbon sources such as wood, coconut shells and the like. In one particular characterization, the sorbent comprises PAC that has been derived from coal, such as lignite coal. PAC derived from coal may have many advantageous morphological properties, such as high surface area, high overall porosity and desirable pore size characteristics that are advantageous for the sequestration of mercury.

The median average particle size (D50) of the particulate sorbent may be relatively small, particularly when the sorbent composition is engineered for the capture of mercury or other heavy metal contaminants from a flue gas stream. In one characterization, the median average particle size of the solid sorbent is not greater than about 50 μm, such as not greater than about 30 μm, or even not greater than about 25 μm. Particularly for the sequestration of mercury from a flue gas stream, it may be desirable to utilize a solid sorbent having a median average particle size of not greater than about 20 μm, not greater than about 15 μm and even not greater than about 12 μm. Characterized in another way, the median particle size may be at least about 5 μm, such as at least about 6 μm, or even at least about 8 μm. The D50 median average particle size may be measured using techniques such as light scattering techniques (e.g., using a Saturn DigiSizer II, available from Micromeritics Instrument Corporation, Norcross, Ga.).

In one characterization, the particulate sorbent (e.g., PAC) has a relatively high total pore volume and a well-controlled distribution of pores, particularly among the mesopores (i.e., from 20 Å to 500 Å width) and the micropores (i.e., not greater than 20 Å width). A well-controlled distribution of micropores and mesopores is desirable for effective removal of mercury from the flue gas stream. While not wishing to be bound by any theory, it is believed that the mesopores are the predominant structures for capture and transport of the oxidized mercury species to the micropores, whereas micropores are the predominate structures for sequestration of the oxidized mercury species.

In this regard, the total pore volume of the solid sorbent (sum of micropore volume plus mesopore volume plus macropore volume) may be at least about 0.10 cc/g, such as at least 0.20 cc/g, at least about 0.25 cc/g or even at least about 0.30 cc/g. The micropore volume of the sorbent may be at least about 0.10 cc/g, such as at least about 0.15 cc/g. Further, the mesopore volume of the sorbent may be at least about 0.10 cc/g, such as at least about 0.15 cc/g. In one characterization, the ratio of micropore volume to mesopore volume may be at least about 0.7, such as 0.9, and may be not greater than about 1.5. Such levels of micropore volume relative to mesopore volume may advantageously enable efficient capture and sequestration of oxidized mercury species by the solid sorbent. Pore volumes may be measured using gas adsorption techniques (e.g., $N_2$ adsorption) using instruments such as a TriStar II Surface Area Analyzer 3020 or ASAP 2020 (Micromeritics Instruments Corporation, Norcross, Ga., USA).

In another characterization, the particulate sorbent has a relatively high surface area. For example, the solid sorbent may have a surface area of at least about 350 $m^2/g$, such as at least about 400 $m^2/g$ or even at least about 500 $m^2/g$. Surface area may be calculated using the Brunauer-Emmett-Teller (BET) theory that models the physical adsorption of a monolayer of nitrogen gas molecules on a solid surface and serves as the basis for an analysis technique for the measurement of the specific surface area of a material. BET surface area may be measured using the Micromeritics TriStar II 3020 or ASAP 2020 (Micromeritics Instrument Corporation, Norcross, Ga.). The sorbent may also advantageously include several different components that synergistically may decrease the time required for mercury oxidation and capture from the flue gas stream (e.g., enhance oxidation reaction kinetics and/or mass diffusional kinetics) and may advantageously reduce the total amount of sorbent (e.g., powder activated carbon sorbent) that must be injected into the flue gas stream to recover sufficient amounts of mercury to meet applicable government regulations.

In this regard, the particulate sorbent may include minerals, e.g., native minerals that originate from the coal source, such as lignite coal. Such native minerals may enhance (e.g., catalyze) the oxidation of elemental mercury by an oxidizing agent (e.g., an oxidizing agent contained in the flue gas stream), an aqueous-based solubilizing medium such as water to solubilize oxidized mercury and enhance mass diffusional kinetics, and a sorbent such as powder activated carbon (PAC) having a well-controlled pore size and pore size distribution to provide a large surface area on which both kinetic mechanisms occur and to provide sufficient microporosity to sequester the oxidized mercury. The sorbent composition of matter may also have a relatively small median particle diameter, i.e., as compared to typical sorbent compositions used for injection into a flue gas stream.

Thus, one component of the particulate sorbent may include native minerals. The minerals may advantageously catalyze the oxidation of the elemental mercury in the flue gas stream. The presence of such minerals may thereby enhance the kinetics of the mercury oxidation such that a reduced contact time with the flue gas stream is required to oxidize and remove sufficient amounts of mercury from the flue gas stream. As used herein, these native minerals are a component of the sorbent, and are different from the other components such as the heat moderator(s) that are added to the sorbent to form the disclosed sorbent composition.

The mineral component of the sorbent may advantageously be comprised of minerals including, but not limited to, aluminum-containing minerals, calcium-containing minerals, iron-containing minerals, silicon-containing minerals, silicate-containing minerals, sodium-containing minerals, potassium-containing minerals, zinc-containing minerals, tin-containing minerals, magnesium-containing minerals, and combinations thereof. These minerals may predominantly be oxide-based minerals, such as metal oxide minerals (e.g., CaO, $Fe_2O_3$, $Fe_3O_4$, FeO, $Al_2O_3$), and silicates (e.g. $Al_2SiO_5$). In one characterization, these minerals predominantly include metal oxides, particularly aluminum oxides and iron oxides. In another characterization, the minerals include calcium-containing minerals, iron-containing minerals and aluminosilicates. These types of minerals are particularly well adapted to catalyze the oxidation reaction of the mercury. Iron-containing minerals are particularly well adapted to catalyze the oxidation reaction, and in one characterization, these minerals include at least 1 wt. % iron-containing minerals. The minerals are intimately intertwined within the carbonaceous component of the sorbent within a well-controlled porous structure that facilitates the oxidation, capture and removal of mercury. To provide sufficient reaction activity and rapid oxidation kinetics, the particulate sorbent may include at least about 20 weight percent of the minerals, such as at least 25 weight percent and even at least about 30 weight percent of the minerals. However, excessive amounts of the minerals in the sorbent may be detrimental to the capture of mercury. In this regard, the sorbent may include not greater than about 50 weight percent of the minerals, such as not greater than about 45 weight percent. Advantageously, the sorbent may include not greater than about 40 weight percent of the minerals, such as not greater than about 35 weight percent of the minerals. The total mineral content of the sorbent may be measured by a TGA701 Thermalgravitmetric Analyzer (LECO Corporation, St. Joseph, Mich.). The specific types and amount of particular minerals may be measured by the Niton XL3t X-Ray Fluorescence (XRF) Analyzer (Thermo Fisher Scientific Inc., Waltham, Mass.).

In addition, the sorbent may also include an amount of aqueous-based solubilizing medium such as water. The presence of a minimum level of solubilizing medium may advantageously enhance the mass diffusional kinetics of the mercury oxidation and sequestration by solubilizing oxidized mercury species on the sorbent surface, e.g., within the mespores and micropores. In this regard, the sorbent may include at least about 2 weight percent of the solubilizing medium, such as at least about 3 weight percent or at least about 6 weight percent. However, the amount of solubilizing medium in the sorbent should be not greater than about 15 weight percent, such as not greater than about 12 weight percent, or even not greater than about 10 weight percent to avoid interfering with the mercury oxidation reaction(s).

In addition to the sorbent and the other components disclosed above, the sorbent composition may also include catalytic metal, a precursor to a catalytic metal, a catalytic metal compound or a precursor to a catalytic metal compound. If the sorbent composition includes a precursor to a metal or a precursor to a metal compound, the precursor should be capable of rapidly converting to the catalytic metal or the catalytic metal compound at the temperatures typically encountered in a flue gas stream, such as at least about 250° F. and not greater than about 700° F. The catalytic metal or catalytic metal compound may be associated with the sorbent in that it may be covalently bound to the sorbent, surface bound, associated via ionic binding, and/or intramolecular forces.

The catalytic metal may be selected from metals that are categorized as transition metals, and may also include other metals including Fe, Cu, Mn, Pd, Au, Ag, Pt, Ir, V, Ni, Zn, Sn, Ti, Ce, and mixtures thereof. In one characterization, the catalytic metal may be selected from Fe, Cu, Mn, Zn and combinations thereof. The catalytic metal(s) may be present as elemental, or ionic species, or in the form of catalytic metal compounds including oxides, hydroxides, or salts such as sulfates, carbonates, nitrates, and halides, of the metals. Examples of such metal compounds may include, but not be limited to, copper (II) oxide (CuO), copper (II) chloride ($CuCl_2$), copper (II) nitrate ($Cu(NO_3)_2$), copper (II) hydroxide ($Cu(OH)_2$), or copper (II) carbonate ($CuCO_3$), iron (III) oxide ($Fe_2O_3$), iron (III) chloride ($FeCl_3$), iron (III) nitrate ($Fe(NO_3)_3$), iron (III) sulfate $Fe_2(SO_4)_3$, cerium (IV) oxide ($CeO_2$), manganese (IV) oxide ($MnO_2$), vanadium (V) oxide ($V_2O_5$), or zinc (II) oxide (ZnO). The use of such catalytic metals with the sorbent composition's is described in more detail in U.S. Patent App. No. 62/005,304 by Huston et al., which is incorporated herein by reference in its entirety.

To further enhance the oxidation reaction kinetics and mass diffusional kinetics, the sorbent composition may have a relatively small average particle size (e.g., median particle diameter, also known in the art as D50) particularly as compared to typical sorbent compositions used for activated carbon injection. In this regard, the sorbent composition of matter may have a median particle diameter of not greater than about 30 µm, such as not greater than about 20 µm, or even not greater than about 15 µm, such as not greater than about 12 µm. The median particle diameter may be measured using techniques such as light scattering techniques (e.g., using a Saturn DigiSizer, available from Micromeritics Instrument Corporation, Norcross, Ga.).

The sorbent composition may also be characterized by having a well-controlled particle density. Controlling the particle density correlates to control over the surface area and total pore volume of the sorbent composition, which in turn affect mercury capture performance.

Particle density may be measured by liquid mercury volume displacement, in which case the result is referred to as the mercury particle density. In this regard, the sorbent composition may have a mercury particle density of at least about 0.4 g/cc, such as at least about 0.6 g/cc. Conversely, the mercury particle density of the sorbent composition may be not greater than about 0.9 g/cc, such as not greater than about 0.8 g/cc. Particle density may be measured by the Micrometrics AutoPore IV Mercury Porosimeter (Micromeritics Inc., Norcross, Ga., USA).

Particle density may also be measured by sedimentary volume displacement, in which case the result is referred to as the envelope or skeletal particle density. The envelope density refers to the weight of solid carbon per given volume occupied by a solid carbon. In this regard, the envelope particle density of the sorbent composition may be at least about 0.4 g/cc, such as at least about 0.6 g/cc or at least about 0.7 g/cc. The envelope particle density of the sorbent composition may be not greater than about 1.0 g/cc, such as not greater than about 0.9 g/cc, or even not greater than about 0.8 g/cc. Envelope particle density may be measured using a Micromeritics GeoPyc Envelope Density Analyzer (Micrometrics, Inc., Norcross, Ga., USA).

The sorbent compositions may also include one or more oxidizing agents that may improve the adsorption of mercury from a flue gas stream. Oxidizing agents may include halogen salts such as inorganic halogen salts, which may include bromine compounds such as bromides, bromates or hypobromites, iodine compounds such as iodides, iodates or hypoiodites, or chlorine compounds such as chlorides, chlorates or hypochlorites. The inorganic halogen salt may be an alkali metal compound or an alkaline earth metal compound, such as one containing a halogen salt, where the inorganic halogen salt is associated with an alkali metal such as lithium, sodium, and potassium or alkaline earth metal such as magnesium, and calcium. Non-limiting examples of inorganic halogen salts including alkali metal and alkaline earth metal counterions include calcium hypochlorite, calcium hypobromite, calcium hypoiodite, calcium chloride, calcium bromide, calcium iodide, magnesium chloride, magnesium bromide, magnesium iodide, sodium chloride, sodium bromide, sodium iodide, potassium chloride, potassium bromide, potassium iodide, and the like. The oxidizing agents may be included in the composition at any concentration, and in some embodiments, no oxidizing agent may be included in the compositions embodied by the present disclosure.

In some embodiments, the sorbent composition may include an acid gas agent such as, for example, an alkaline compound. Numerous alkaline agents are known in the art and currently used to remove sulfur oxide species from flue gas and any such alkaline agent may be used in the invention. For example, in various embodiments, the alkaline additive may be alkali oxides, alkaline earth oxides, hydroxides, carbonates, bicarbonates, phosphates, silicates, aluminates, and combinations thereof, and in certain embodiments, the alkaline agent may be calcium carbonate ($CaCO_3$), calcium oxide (CaO), calcium hydroxide ($Ca(OH)_2$); magnesium carbonate ($MgCO_3$); magnesium hydroxide ($Mg(OH)_2$) magnesium oxide (MgO), sodium carbonate ($Na_2CO_3$), sodium bicarbonate ($NaHCO_3$), trisodium hydrogendicarbonate dihydrate ($Na_3(CO_3)$ ($HCO_3$).$2H_2O$), and combinations thereof.

In one particular example, the acid gas agent is a trivalent or higher Group 3 to Group 14 metal-containing compound selected from the group consisting of a carbonate, an oxide, a hydroxide, an ionic salt precursor to a hydroxide and combinations thereof. For example, the trivalent or higher metal may be selected from Group 13 to Group 14 metals, and in certain characterizations the trivalent or higher metal is a Group 13 metal. For example, the trivalent or higher metal may be aluminum. In other characterizations, the trivalent or higher metal may be tin. The metal-containing compound may comprise an anion and a cation, where the cation includes the trivalent or higher metal. The metal-containing compound may also be a metal oxide, for example $SnO_2$. The metal-containing compound may also be a metal hydroxide, such as aluminum hydroxide. The metal-containing compound may also be an ionic salt precursor to a metal hydroxide, such as an ionic salt that includes a polyatomic anion where the trivalent or higher Group 3 to Group 14 metal is a component of the polyatomic anion. The polyatomic anion may be an oxoanion and the metal may be aluminum. For example, the ionic salt may be sodium aluminate or sodium stannate. Such acid gas agents are disclosed in more detail in commonly-owned U.S. patent application Ser. No. 14/142,636 by Wong et al., which is incorporated herein by reference in its entirety.

Figure 3:
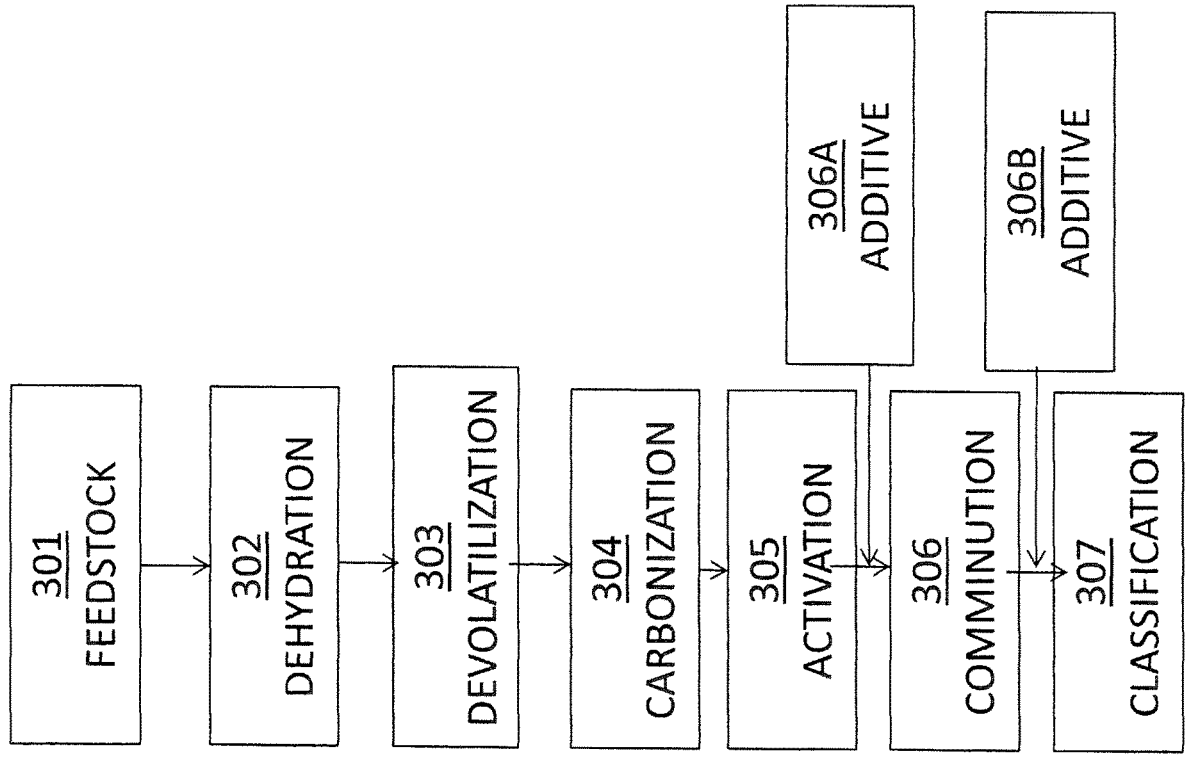
FIG. 3 is a flow sheet illustrating a method for the manufacture of a sorbent composition.

FIG. 3 is a flow sheet that illustrates an exemplary method for the manufacture of a sorbent composition in accordance with one embodiment. The manufacturing process begins with a carbonaceous feedstock 301 such as low-rank lignite coal with a relatively high content of natural deposits of native minerals. In the manufacturing process, the feedstock is subjected to an elevated temperature and one or more oxidizing gases under exothermic conditions for a period of time to sufficiently increase surface area, create porosity, alter surface chemistry, and expose and exfoliate native minerals previously contained within feedstock. The specific steps in the process include: (1) dehydration 302, where the feedstock is heated to remove the free and bound water, typically occurring at temperatures ranging from 100° C. to 150° C.; (2) devolatilization 303, where free and weakly bound volatile organic constituents are removed, typically occurring at temperatures above 150° C.; (3) carbonization 304, where non-carbon elements continue to be removed and elemental carbon is concentrated and transformed into random amorphous structures, typically occurring at temperatures of from about 350° C. to about 800° C.; and (4) activation 305, where steam, air or other oxidizing agent(s) are added and pores are developed, typically occurring at temperatures above 800° C. The manufacturing process may be carried out, for example, in a multi-hearth or rotary furnace. The manufacturing process is not discrete and steps can overlap and use various temperatures, gases and residence times within the ranges of each step to promote desired surface chemistry and physical characteristics of the manufactured product.

After activation 305, the product may be subjected to a comminution step 306 to reduce the particle size (e.g., reduce the median particle diameter) of the activated product. Comminution 306 may occur, for example, in a mill such as a roll mill, jet mill or other like process. Comminution 306 may be carried out for a time sufficient to reduce the median particle diameter of the thermally treated product to not greater than about 25 µm. In one embodiment, an additive being a heat moderator, a surface agent, or a permeability additive may be alternatively admixed with the product before 306A or after 306B comminution 306. In another embodiment, a slurry or aqueous mixture or solution of an additive being a heat moderator, permeability additive, or surface agent may be alternatively sprayed on or mixed with the product either before 306A or after 306B comminution to coat the sorbent.

In yet another embodiment, an aqueous mixture or solution of additive may be sprayed or coated on the product after comminution 306B and dried to create a mono-layer coated product. This mono-layer may be comprised of a binding agent that binds the heat moderator to the sorbent, as is described above. Following coating of the heat moderator onto the binding agent layer, a second layer of binding agent and heat moderator may be sprayed or coated onto the now bi-layer coated product and dried to create the bi-layer coated product. These coating and drying steps may be repeated multiple times to create multiple bi-layers on the product. The heat moderators that are used for each layer may be the selected from groups as previously described and may be the same in each layer or may differ in each layer.

In the event that manufacturing conditions result in a different particle size distribution than is desired, classification 307 may be carried out to separate particles by size. For example, classification 307 may be carried out using an air classifier, screen/mesh classification (e.g., vibrating screens), sieves, or centrifugation. Sorbents that have a higher median particle diameter, of for instance a D50 of 20 µm to 30 µm, may be mixed with a sorbent having a smaller median particle diameter, such as a D50 of 15 µm, or even 12 µm, or even 10 µm or less, at various ratios to obtain a product with desirable characteristics such as increased permeability or mercury capture performance, e.g., through the use of a bimodal particle size distribution. Further additives may be admixed, coated or impregnated on compositions that have been classified, and/or classified and mixed to predetermined ratios.

EXAMPLES

Example 1

Several example sorbent compositions according to the present disclosure are prepared and are tested to measure the thermal properties as compared to a prior art sorbent composition. These properties are compared to Sample A, which is a prior art PAC sorbent composition, namely PowerPAC Premium®, available from ADA Carbon Solutions, Littleton, Colo. Sample A is a particulate PAC-based sorbent that is brominated and has a particle size such that a minimum of 95% of the sorbent is −325 mesh. Example sorbent compositions, Samples C-G, are made by mixing the sorbent of Sample A with a 10 wt. % concentration of a heat moderator in a ball milling device. Prior to mixing with Sample A, the heat moderator is milled into particles having a D50 particle diameter of about 5 µm or less. Table I lists the heat moderators for Samples C-H. Natural montmorillonite (Nanofil® 116) is obtained from Southern Clay Products, Inc., Gonzales, Tex. The halloysite clay additives (DRAGONITE HP™ and DRAGONITE XR™) are obtained from Applied Minerals, Inc., New York, N.Y. The organic phosphinate additive is based on aluminum diethyl-phosphinate (Exolit® OP 1230) from Clariant International Ltd., Muttenz, Switzerland, and the sodium sulfite additive is obtained from Sigma Aldrich, St. Louis, Mo.

Figure 4:
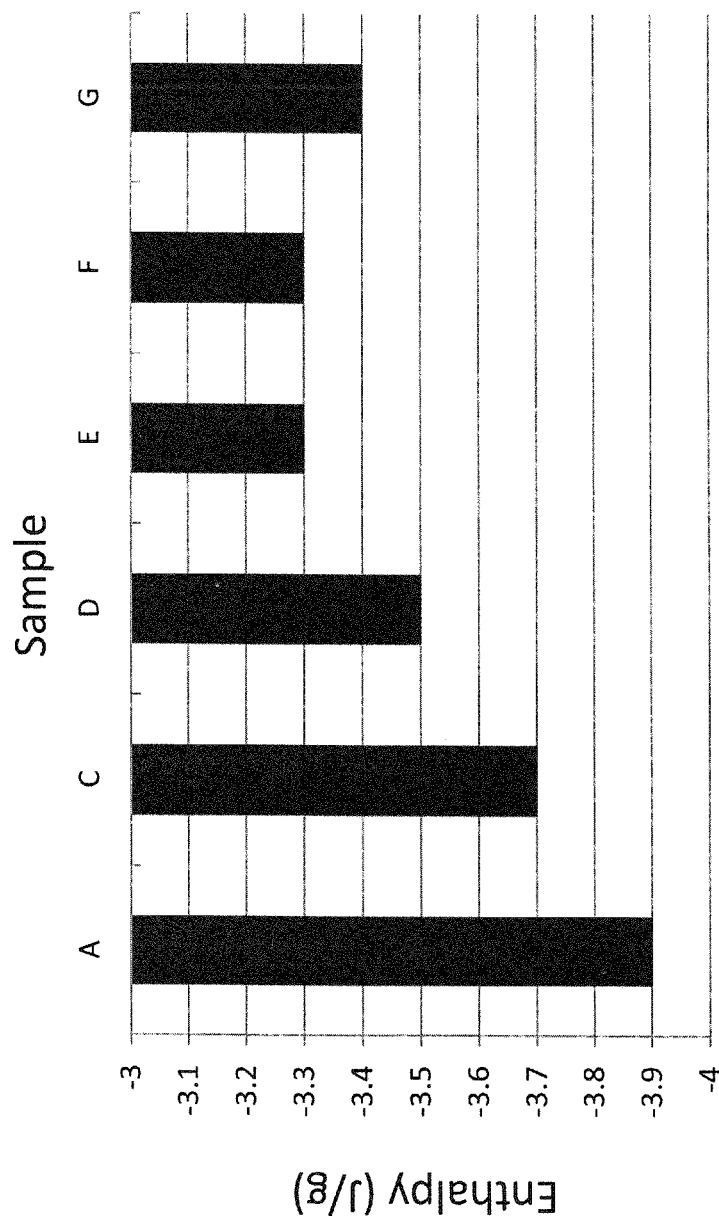
FIG. 4 illustrates specific enthalpy values for various sorbent compositions.

Differential scanning calorimetry ("DSC") is used to detect the heat flow, specifically to quantitatively detect the exothermal peak after the chamber atmosphere is switched from an inert ($N_2$) atmosphere to a 100% oxygen atmosphere at a certain temperature. The effectiveness of the heat moderators can be determined by the amount of heat released after this change in atmosphere. The DSC instrument is a TA Instruments Q2000 differential scanning calorimeter available from TA Instruments, New Castle, Del. For these tests, a sample of the sorbent composition is placed in a sealed chamber and is heated to and stabilized at 150° C. The atmosphere is then switched from 100% $N_2$ to 100% $O_2$ and the chamber temperature is increased to 160° C. A release of heat from the sorbent composition is observed due to the rapid oxygen adsorption by the PAC. The heat released by this exothermic reaction is measured over time as heat flow in joules (J) and the specific enthalpy of the sorbent composition in joules per gram (J/g) may be calculated Such DSC measurements are made for Comparative Sample A and Samples C-G and the specific enthalpy in joules per gram (J/g) for each sample is illustrated in FIG. 4. Further, specific heat capacity is calculated from the collected data and these values as well as the specific enthalpy, percent reduction in specific enthalpy as compared to Sample A, and percent increase in specific heat capacity as compared to Sample A, are reported in Table I. Example compositions that include heat moderators demonstrate specific enthalpy reductions of as much as 15%, and specific heat capacity increase by as much as 61% as is indicated in Table I, reflecting lowered reactivity with the oxygen and thus reduced self-heating properties.

TABLE I

Sorbent Compositions Specific Enthalpy and Heat Flow and Capacity

| Sample | Additive (10 wt. %) | Specific Enthalpy (J/g) | % Enthalpy Reduction from Baseline | Specific Heat Capacity at 160° C. (J/g ° C.) | % Specific Heat Capacity Increase at 160° C. |
|---|---|---|---|---|---|
| A | None | −3.9 | Baseline | 1.03 | Baseline |
| C | natural montmorillonite (Nanofil ® 116) | −3.7 | 5% | 1.37 | 33 |
| D | halloysite clay (Dragonite-HP ™) | −3.5 | 10% | 1.38 | 34 |
| E | halloysite clay (Dragonite-XR ™) | −3.3 | 15% | 1.13 | 10 |
| F | Organic phosphinate (Exolit ® OP 1230) | −3.3 | 15% | 1.66 | 61 |
| G | sodium sulfite | −3.4 | 13% | 1.42 | 38 |

Example 2

To better understand how a sorbent composition sample may perform in a setting that more closely mimics the BH unit conditions, a bulk lot of each example composition is tested in what is known as the Frank-Kamenetskii theory test. The Frank-Kamenetskii theory allows for the temperature gradient of a mass or bulk of a substance to be taken into account. If the material is a good thermal insulator, heat will be trapped within the sample even if there is a high surface area. The example compositions can be tested for heat build-up within a bulk sample by a method wherein a four inch cube is filled with a test sample and temperature is measured at different points within the cube, namely a top, middle, and bottom portion along with the ambient temperature surrounding the cube, in a heated environment such as an oven.

Figure 5:
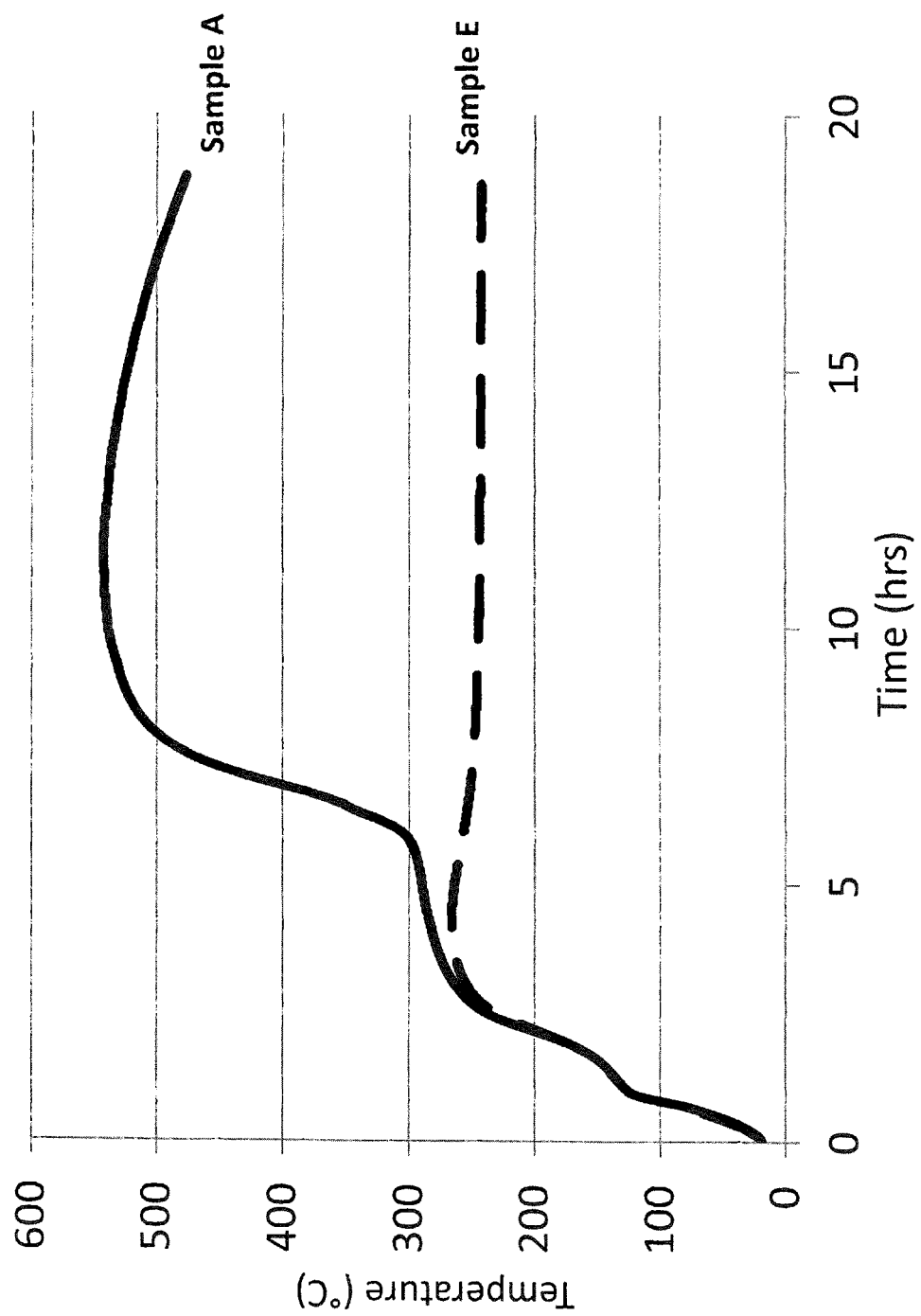
FIG. 5 illustrates temperature of a sorbent composition of this disclosure (Sample F) versus a comparative sorbent composition (Sample A) measured in a Frank-Kamenetskii test cube at 240° C.
Figure 6:
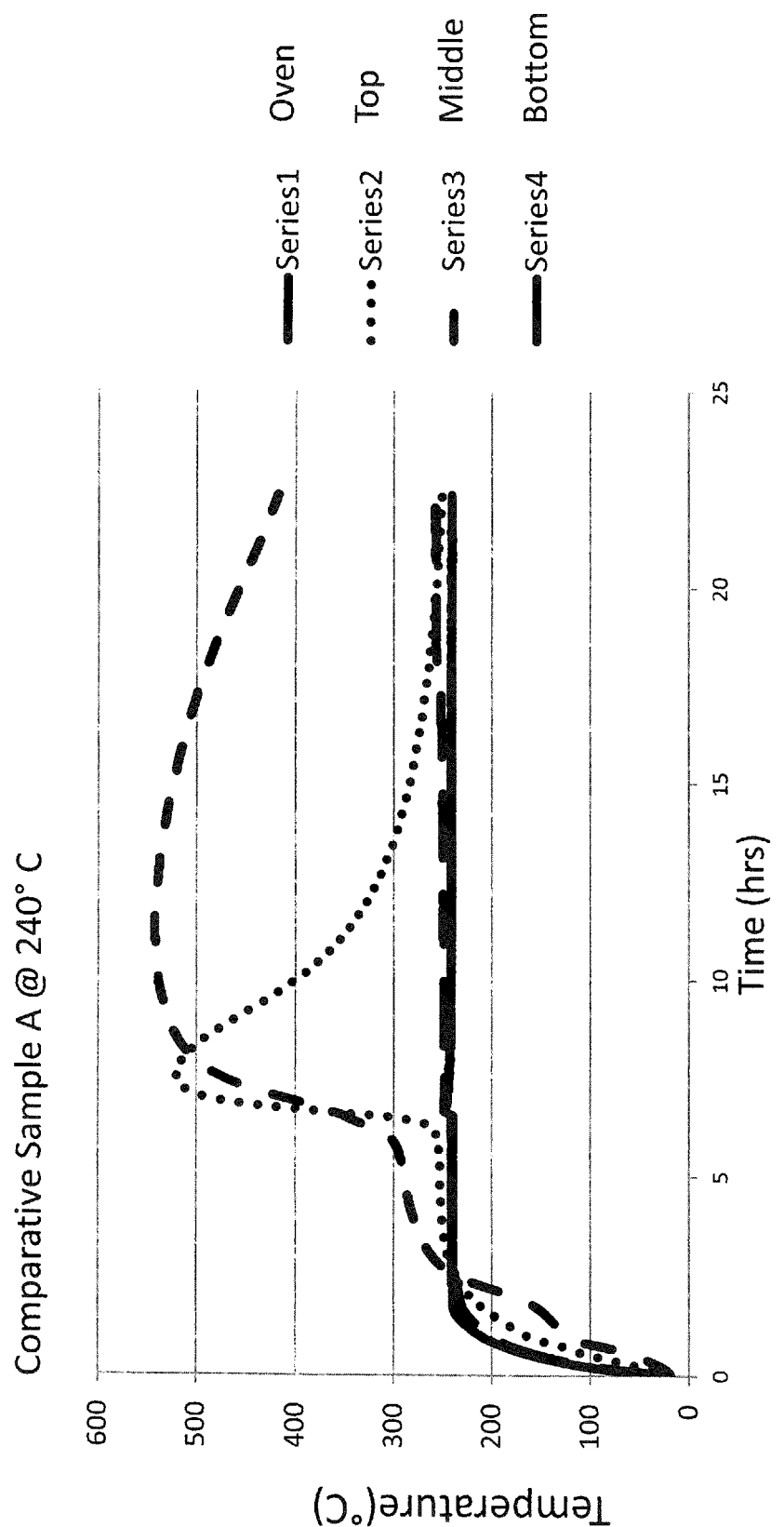
FIG. 6 illustrates the temperatures of a comparative prior art sorbent composition (Sample A) over time measured in a Frank-Kamenetskii test cube at 240° C.

FIG. 5 illustrates ambient temperature readings in the middle of the cube during heating at a constant temperature of 240° C. of the comparative Sample A and Sample E during a Frank-Kamenetskii test using a 4-inch carbon steel cubic container. During this test, the oven temperature is kept stationary and the temperature of the samples is measured over time. 240° C. is previously determined to be the auto-ignition temperature for comparative Sample A by testing over a range of temperatures, and FIG. 6 illustrates that Sample A auto-ignites within about 6 hours at 240° C. The addition of the halloysite heat moderator (Dragonite-XR™) in Sample E prevents the sample from igniting at the baseline test temperature of 240° C., i.e., the auto-ignition temperature of the sample sorbent composition has been increased through the addition of the halloysite heat moderator.

Figure 7:
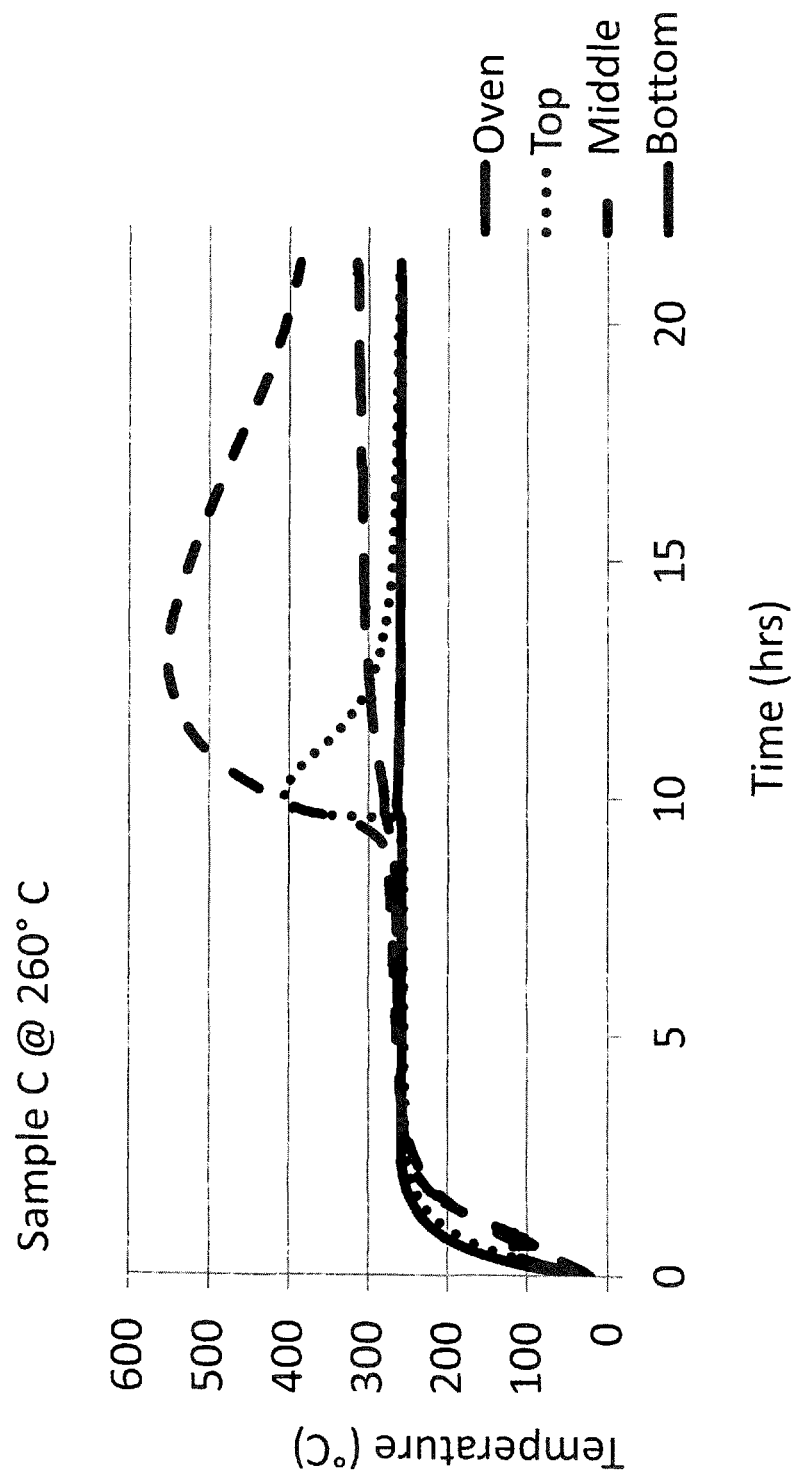
FIG. 7 illustrates the temperatures of a sorbent composition of the present disclosure (Sample C) over time measured in a Frank-Kamenetskii test cube at 260° C.
Figure 8:
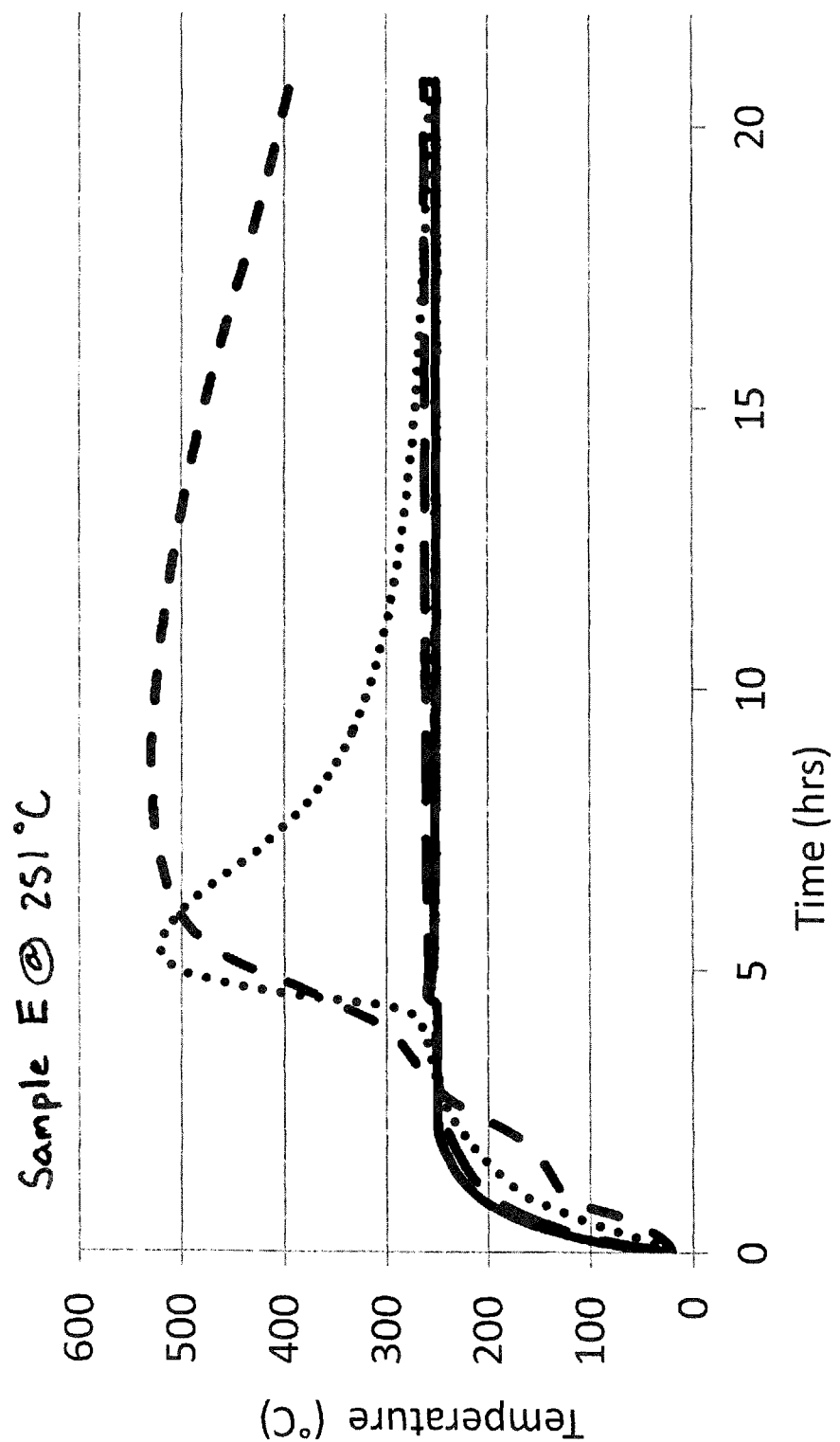
FIG. 8 illustrates the temperatures of a sorbent composition of the present disclosure (Sample F) over time measured in a Frank-Kamenetskii test cube at 251° C.

FIGS. 6-8 illustrate temperature readings of the comparative Sample A, Sample C, and Sample E, respectively, in the oven, at the top, in the middle, and at the bottom of the samples during this Frank-Kamenetskii test. FIG. 6 illustrates readings for the comparative Sample A with a constant oven temperature at the auto-ignition temperature of the sample (240° C.). At about 6 hours, the temperature in the middle and top of the cube increase dramatically, indicating auto-ignition. Samples C and E are determined to exhibit higher auto-ignition temperatures of 260° C. and 251° C., respectively. FIG. 7 illustrates temperature readings for Sample C, in the oven, at the top of the sample, in the middle, and at the bottom of the sample. Sample C exhibits increased auto-ignition temperature. FIG. 8 illustrates temperature readings for Sample E, in the oven, at the top of the sample, in the middle, and at the bottom of the sample, illustrating increased auto-ignition temperature. Table II shows results of the tests over a range of temperatures to determine the auto-ignition temperature.

TABLE II

| Sample | Auto-ignition Temp (° C.) |
|---|---|
| A | 240 |
| C | 260 |
| E | 251 |

Example 3

Figure 9:
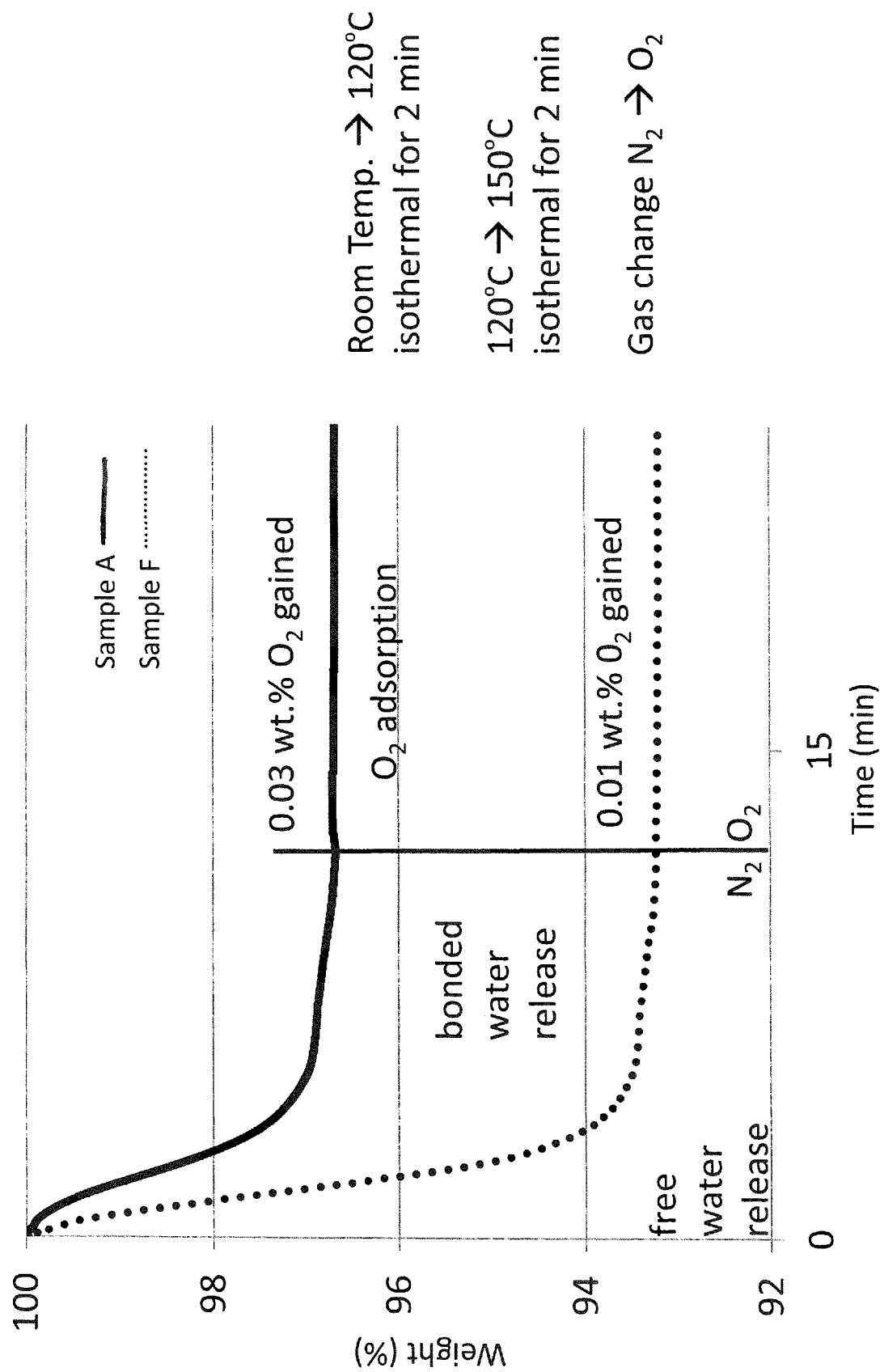
FIG. 9 illustrates a thermal gravimetric analysis (TGA) of a comparative sorbent composition (Sample A) and a composition of the present disclosure (Sample G).

Thermal gravimetric analysis (TGA) is a method of thermal analysis in which changes in physical and/or chemical properties of materials are measured as a function of increasing temperature with a constant heating rate. TGA can be used to evaluate the thermal stability of a material. In a desired temperature range, if a species is thermally stable, there will be no observed mass change. Negligible mass loss corresponds to little or no slope in the TGA trace. Here, weight of the sample is measured over time, with heating first to 120° C. in the presence of nitrogen ($N_2$) gas, then to 150° C., followed by a change to a 100% oxygen ($O_2$) environment. A change in weight of a sorbent composition upon heating to 120° C. is attributed to water release. The amount of $O_2$ adsorbed by the composition may be calculated from the gain in mass when the composition is exposed to the 100% $O_2$ environment at 150° C. In FIG. 9, a thermal gravimetric analysis of the comparative Sample A and Sample F is illustrated. The weight, of each sample, in percent, is plotted against time. Sample A absorbs 0.03% $O_2$, whereas Sample F only absorbs 0.01% $O_2$, indicating a 67% reduction in the amount of $O_2$ absorption by Sample F. Reduced $O_2$ absorption indicates reduced combustibility of Sample F.

Example 4

Figure 10:
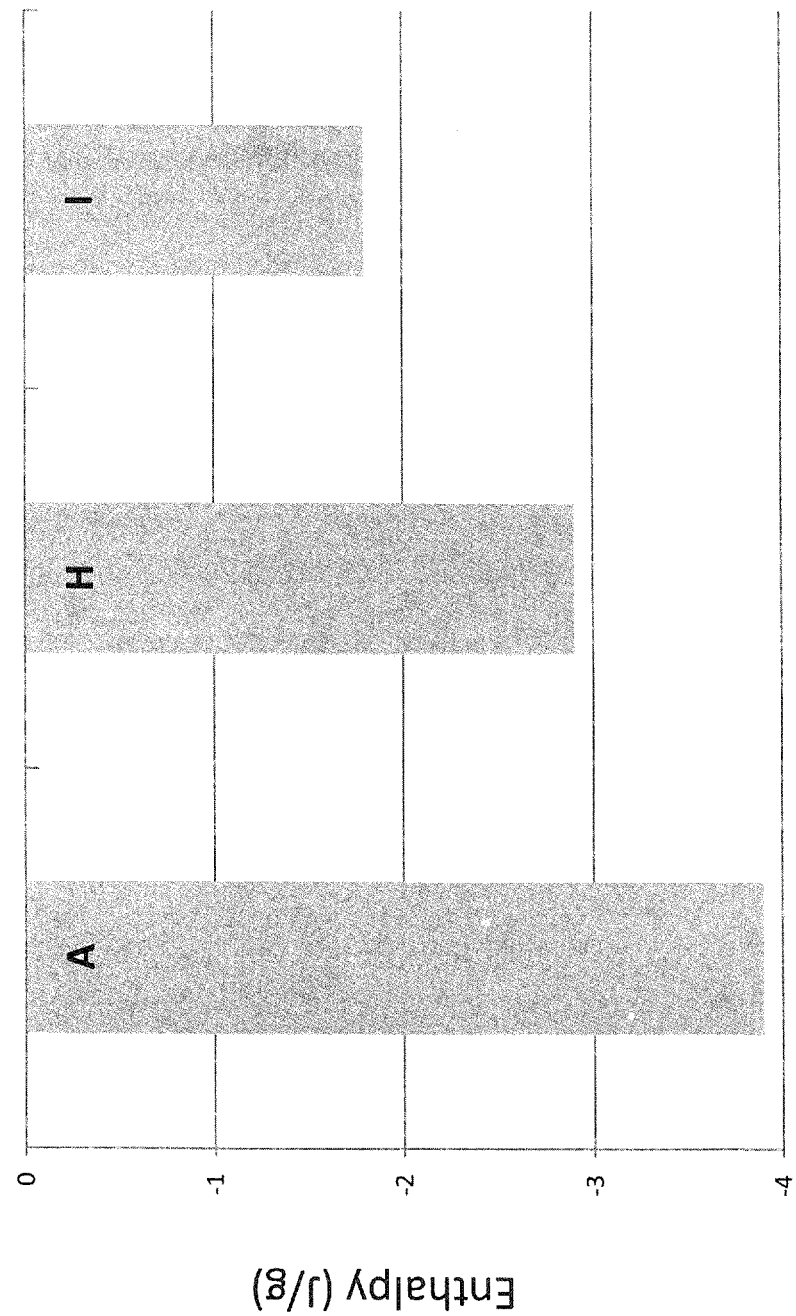
FIG. 10 illustrates the specific enthalpy of a prior art comparative sorbent composition (Sample A) and sorbent compositions of the present disclosure (Sample H and Sample I).
Figure 11:
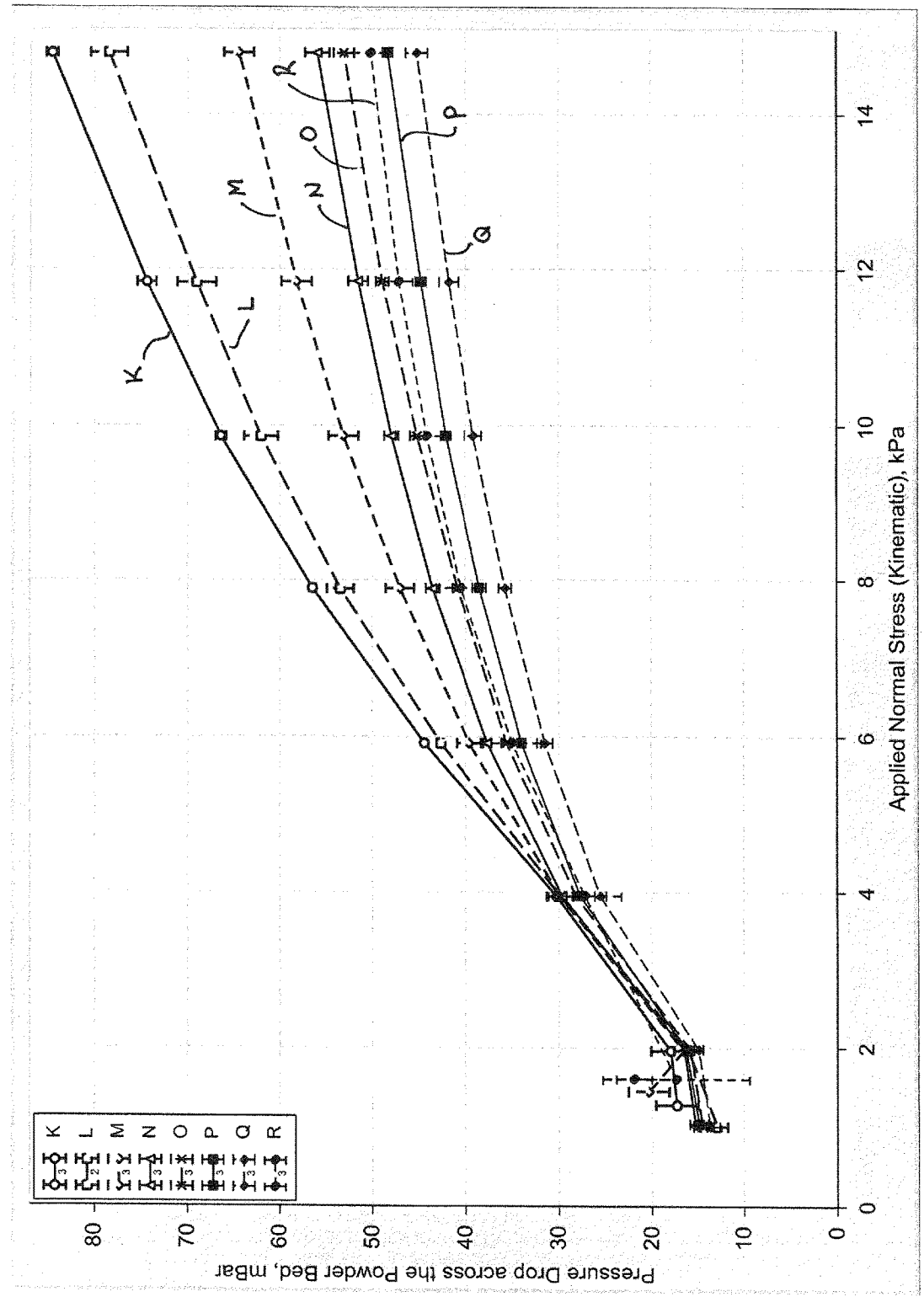
FIG. 11 illustrates the pressure drop in mBar across a powder bed as measured in a Permeability test over a range of applied normal stress of 1 to 15 kPa of various sorbent compositions according to the present disclosure.

Comparative Sample A is treated with a binding agent, chitosan, and natural or synthetic montmorillonite, to create bilayers. Three bi-layers of chitosan-montmorillonite are coated onto Sample A to make Sample H and Sample I in the following manner. First, Sample A is dispersed in 0.1 wt. % chitosan solution, the mixture is magnetically stirred for 10 minutes, filtered, and dried in a convection oven at 80° C. Next the dried composition is dispersed in a 0.3 wt. % montmorillonite dispersion, magnetically stirred for 10 minutes, filtered, and dried in the same oven at 80° C. These two steps are repeated two additional times to create a triple chitosan-montmorillonite bi-layer on Sample A. For Sample H, a natural montmorillonite (Nanofil® 116) is used for the heat moderator coating. For Sample I a synthetic montmorillonite (Laponite®) is used for the heat moderator coating. FIG. 10 illustrates the heat release during the differential scanning calorimetry test described previously at temperatures between 150° C. and 160° C. Table III summarizes results of this test. The chitosan-natural montmorillonite triple bi-layer coating reduces specific enthalpy by 26% and the chitosan-synthetic montmorillonite triple bi-layer coating synthetic reduces specific enthalpy by 54%.

TABLE III

Differential Scanning Calorimetry Results from Bi-layer Coated Samples

| Sample | Additive | Specific Enthalpy (J/g) | % Enthalpy Reduction |
|---|---|---|---|
| A | None | −3.9 | Baseline |
| H | chitosan & natural montmorillonite triple bi-layer coating | −2.9 | 26% |
| I | chitosan & synthetic montmorillonite triple bi-layer coating | −1.8 | 54% |

Example 5

To evaluate how sorbent compositions might behave in a BH unit with regard to exhaust flow and/or impedance of the exhaust flow through the BH unit permeability tests are performed as described above. Two sorbent compositions are used for comparison including a smaller median particle diameter sample, Sample K, being FastPAC Premium® (ADA Carbon Solutions), with a D50 of about 12 μm, and a larger median particle diameter sample, Sample R, being PowerPAC Premium® PLUS (ADA Carbon Solutions), with a D50 of about 20 μm.

FIG. 11 illustrates permeability tests of example sorbent compositions, being mixtures of Sample K and Sample R in given ratios, with or without an admixed flow agent additive, the additive being graphite (Micro 850 grade, Asbury Carbons, Asbury Graphite Mill, Inc., Asbury, N.J.). This test, illustrated in FIG. 11, measures pressure drop as a function of applied normal stress. In the test the air velocity is held constant at 0.4 mm/s and the applied normal stress is increased to 15 kPa. The pressure drop is measured at 15 kPa and these results are summarized in Table IV.

TABLE IV

Pressure Drop of Example Sorbent Compositions

| Sample | Composition (% small-% large) | Pressure Drop (mBar) | % Improvement compared to Sample K |
|---|---|---|---|
| K* (12 μm) | 100% K | 84.5 | — |
| L | K + 1 wt. % Graphite | 78.5 | 8 |
| M | 50% K + 50% R | 64.4 | 25 |
| N | 25% K + 75% R | 55.9 | 34 |
| O | 25% K + 75% R + 1 wt. % Graphite | 53.0 | 36 |
| P | 15% K + 85% R | 48.3 | 44 |
| Q | 15% K + 85% R + 1 wt. % Graphite | 45.2 | 47 |
| R* (20 μm) | 100% R | 50.1 | N/A |

*comparative example

Mixing the smaller median particle diameter Sample K with the larger median particle diameter Sample R decreases the pressure drop compared to pure Sample K, indicating increased permeability of the mixed samples. The addition of 1 wt. % graphite to the sorbent composition further decreases pressure drop. Example compositions show improved permeability as shown with a decreased pressure drop by as much as 47% by over the small median particle diameter PAC, Sample K at an applied normal stress of 15 kPa.

While various embodiments have been described in detail, it is apparent that modifications and adaptations of those embodiments will occur to those skilled in the art. However, is to be expressly understood that such modifications and adaptations are within the spirit and scope of the present disclosure.

What is claimed is:

1. A sorbent composition that enhances baghouse unit performance, the sorbent composition comprising:

a first particulate sorbent comprising powdered activated carbon and having a median particle diameter of not greater than about 30 μm and at least about 20 μm; and a second particulate sorbent comprising powdered activated carbon and having a median particle diameter of not greater than about 20 μm and at least about 8 μm, wherein the median particle diameter of the second particulate sorbent is at least about 5 μm less than the median particle diameter of the first particulate sorbent, wherein a pressure drop as measured in a permeability test under an applied normal stress of 15 kPa at an air velocity of 0.5 mm/s is not greater than about 78 mBar.

2. The composition of claim 1, wherein a weight ratio of the first particulate sorbent to the second particulate sorbent is not greater than about 5:1.

3. The composition of claim 1, wherein a weight ratio of the first particulate sorbent to the second particulate sorbent is not greater than about 4:1.

4. The composition of claim 1, wherein a weight ratio of the first particulate sorbent to the second particulate sorbent is at least about 1:6.

5. The composition of claim 1, wherein a weight ratio of the first particulate sorbent to the second particulate sorbent is at least about 1:1

6. The composition of claim 1, wherein a weight ratio of the first particulate sorbent to the second particulate sorbent is at least about 2:1.

7. The composition of claim 1, further comprising an oxidizing agent.

8. The composition of claim 7, wherein the oxidizing agent comprises an inorganic halogen salt.

9. The composition of claim 1, further comprising a flow aid selected from the group consisting of graphite, talc, mica and combinations thereof.

10. The composition of claim 1, wherein the sorbent composition comprises not more than about 10 wt. % of sorbent particles having a size of less than 5 μm based on a total sorbent composition.

11. The composition of claim 1, further comprising a permeability additive selected from the group consisting of perlite, silica, diatomaceous earth, zeolites, and combinations thereof

12. A sorbent composition that enhances baghouse unit performance comprising a particulate sorbent having a median particle diameter (D50) of not greater than about 30 μm, and a permeability additive comprising perlite, wherein a pressure drop as measured in a permeability test under an applied normal stress of 15 kPa at an air velocity of 0.5 mm/s is not greater than about 78 mBar.

13. The composition of claim 12, wherein the pressure drop as measured in a permeability test under an applied normal stress of 15 kPa at an air velocity of 0.5 mm/s is not greater than about 65 mBar.

14. The composition of claim 12, wherein the pressure drop as measured in a permeability test under an applied normal stress of 15 kPa at an air velocity of 0.5 mm/s is not greater than about 50 mBar.

15. The composition of claim 12, wherein the composition comprises at least about 0.5 wt.% of the permeability additive.

16. The composition of claim 12, wherein the composition comprises not greater than about 10 wt.% of the permeability additive.

17. The composition of claim 12, further comprising an oxidizing agent.

18. The composition of claim 17, wherein the oxidizing agent comprises an inorganic halogen salt.

19. The composition of claim 12, wherein the particulate sorbent comprises powdered activated carbon.

20. A sorbent composition that enhances baghouse unit performance, the sorbent composition comprising:
   a first particulate sorbent comprising powdered activated carbon and having a median particle diameter of not greater than about 30 µm and at least about 20 µm; and
   a second particulate sorbent comprising powdered activated carbon and having a median particle diameter of not greater than about 20 µm and at least about 8 µm, wherein the median particle diameter of the second particulate sorbent is at least about 5 µm less than the median particle diameter of the first particulate sorbent.

21. The composition of claim 20, wherein a weight ratio of the first particulate sorbent to the second particulate sorbent is not greater than about 5:1.

22. The composition of claim 20, wherein a weight ratio of the first particulate sorbent to the second particulate sorbent is not greater than about 4:1.

23. The composition of claim 20, wherein a weight ratio of the first particulate sorbent to the second particulate sorbent is at least about 1:6.

24. The composition of claim 20, wherein a weight ratio of the first particulate sorbent to the second particulate sorbent is at least about 1:1.

25. The composition of claim 20, wherein a weight ratio of the first particulate sorbent to the second particulate sorbent is at least about 2:1.

26. The composition of claim 20, further comprising an oxidizing agent.

27. The composition of claim 26, wherein the oxidizing agent comprises an inorganic halogen salt.

28. The composition of claim 20, further comprising a flow aid selected from the group consisting of graphite, talc, mica and combinations thereof.

29. The composition of claim 20, wherein the sorbent composition comprises not more than about 10 wt. % of sorbent particles having a size of less than 5 µm based on a total sorbent composition.

30. The composition of claim 20, further comprising a permeability additive selected from the group consisting of perlite, silica, diatomaceous earth, zeolites, and combinations thereof.

* * * * *